United States Patent
Söllner et al.

(10) Patent No.: US 11,467,306 B2
(45) Date of Patent: Oct. 11, 2022

(54) PROCESSES AND SYSTEMS FOR CORRECTING RECEIVER MOTION AND SEPARATING WAVEFIELDS IN SEISMIC DATA RECORDED WITH MULTICOMPONENT STREAMERS

(71) Applicant: PGS Geophysical AS, Oslo (NO)

(72) Inventors: Walter Söllner, Oslo (NO); Elsa Cecconello, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 1108 days.

(21) Appl. No.: 16/049,446

(22) Filed: Jul. 30, 2018

(65) Prior Publication Data

US 2019/0137643 A1    May 9, 2019

Related U.S. Application Data

(60) Provisional application No. 62/544,251, filed on Aug. 11, 2017.

(51) Int. Cl.
*G01V 1/36* (2006.01)
*G01V 1/28* (2006.01)

(52) U.S. Cl.
CPC ............ *G01V 1/362* (2013.01); *G01V 1/282* (2013.01); *G01V 2210/1423* (2013.01); *G01V 2210/59* (2013.01); *G01V 2210/679* (2013.01)

(58) Field of Classification Search
CPC .............. G01V 1/282; G01V 2210/59; G01V 2210/679
See application file for complete search history.

(56) References Cited

U.S. PATENT DOCUMENTS

| | | | | |
|---|---|---|---|---|
| 8,554,484 B2 * | 10/2013 | Van Manen | ........... | G01V 1/364 702/14 |
| 9,046,626 B2 * | 6/2015 | Pires De Vasconcelos | ................. | G01V 1/38 |
| 9,864,082 B2 * | 1/2018 | Valenciano Mavilio | ................... | G01V 1/28 |
| 10,288,753 B2 * | 5/2019 | Poole | ....................... | G01V 1/38 |

OTHER PUBLICATIONS

Claerbout, Jon F., "Fundamentals of Geophysical Data Processing," Blackwell Scientific Publishing, 1976, pp. 153-162.
Fokkema, J.T., et al., "Seismic Applications of Acoustic Reciprocity," Elsevier Science Publishers 1993, pp. 199-213.
Chapman, Chris H., "Fundamentals of Seismic Wave Propagation," Cambridge University Press, 2004, pp. 100-107.

* cited by examiner

*Primary Examiner* — Elias Desta

(57) ABSTRACT

Processes and systems for generating images of a subterranean formation from recorded seismic data obtained in a marine survey are described. Processes and systems compute reverse-time receiver-motion-corrected upgoing and downgoing pressure wavefields at different locations of corresponding upgoing and downgoing observation levels based on the recorded seismic data. The reverse-time receiver-motion-corrected upgoing and downgoing pressure wavefields are time forwarded and extrapolated to obtain a corresponding receiver-motion-corrected upgoing and downgoing pressure wavefields at locations of a static observation level. An image of the subterranean formation is generated based at least in part on the receiver-motion-corrected upgoing pressure wavefield and the receiver-motion-corrected downgoing pressure wavefield.

29 Claims, 28 Drawing Sheets

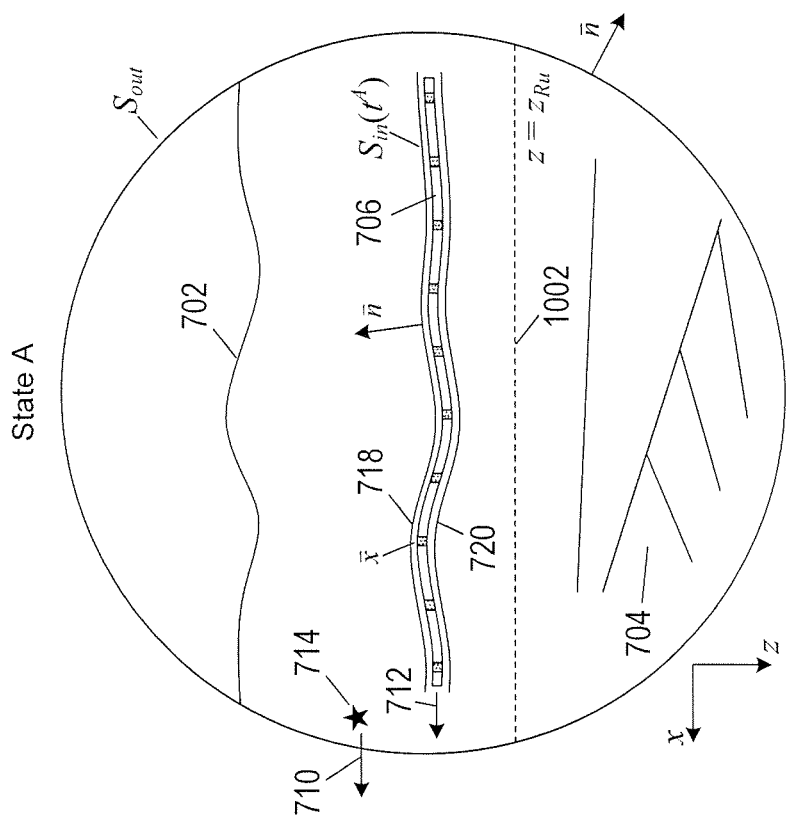

PROCESSES AND SYSTEMS FOR CORRECTING RECEIVER MOTION AND SEPARATING WAVEFIELDS IN SEISMIC DATA RECORDED WITH MULTICOMPONENT STREAMERS

CROSS-REFERENCE TO A RELATED APPLICATION

This application claims the benefit of Provisional Application 62/544,251, filed Aug. 11, 2017, which application is hereby incorporated by reference entirely as if fully set forth herein.

BACKGROUND

Marine seismology companies invest heavily in the development of marine seismic surveying equipment and seismic data processing techniques in order to obtain accurate, high-resolution seismic images of subterranean formations located beneath a body of water. High-resolution seismic images of a subterranean formation are used to determine the structure of subterranean formations, discover petroleum reservoirs, and monitor petroleum reservoirs during production. A typical marine seismic survey is carried out with one or more survey vessels that tow one or more seismic sources and a number of streamers through the body of water. The survey vessel contains seismic acquisition equipment, such as navigation control, seismic source control, seismic receiver control, and recording equipment. The seismic source control controls activation of the one or more seismic sources at selected times or locations. A seismic source can be an impulsive source, such as an array of air guns, that are activated to produce acoustic energy with an impulsive signature. A seismic source can be a marine vibrator that emits acoustic energy with a substantially constant signature over a much longer time period. The acoustic energy generated by a seismic source spreads out in all directions. A portion of the acoustic energy travels down through the water and into a subterranean formation to propagate as sound waves within the subterranean formation. At each interface between different types of rock and sediment, a portion of the sound wave is refracted, a portion is transmitted, and another portion is reflected back into the body of water to propagate toward the water surface. The streamers are elongated spaced apart cable-like structures towed behind a survey vessel in the direction the survey vessel is traveling (i.e., in-line direction) and are typically arranged substantially parallel to one another. Each streamer contains a number of seismic receivers or sensors that detect pressure and/or particle motion wavefields of the sound waves. The streamers collectively form a seismic data acquisition surface that records the wavefields as seismic data in the recording equipment. The recorded pressure and/or particle motion wavefields are processed to produce images of the subterranean formation.

Ideally, streamers maintain a static linear configuration as the streamers are towed through a body of water during seismic data recording. In practice, however, the streamers pass through changing water conditions, such as upwellings, swells, changing free surface conditions, and shifting currents, that create smooth undulations along the lengths of the streamers. The changing water conditions cause the locations of the receivers to vary over time and distance, introducing time-variant positioning errors in the locations of seismic events recorded in the seismic data. The errors may be mitigated in traditional marine surveys by recording seismic data in favorable water and weather conditions or recording in short recording time intervals. For example, in a typical marine survey, after each activation of the source, seismic data is recorded in short recording time intervals of about 8-12 seconds. Receiver motion correction techniques can be applied to the seismic data to correct small or negligible displacement by shifting seismic events to the positions the events would have been recorded in had the receivers remained stationary during seismic data recording. On the other hand, the receivers may experience much larger displacements from the linear configuration over time and distance in marine surveys carried out in rough water and weather conditions or marine surveys conducted with long recording time intervals (e.g., greater than 12 seconds), such as marine surveys conducted with marine vibrators or continuous recording. Typical receiver motion correction techniques do not adequately correct for large receiver displacements. As a result, conventional wavefield separation techniques fail to adequately separate the wavefields into upgoing and downgoing wavefield components, resulting in inaccurate images of subterranean formations.

DESCRIPTION OF THE DRAWINGS

FIG. 10 shows an in-line direction and depth plane view of a physical state.

DETAILED DESCRIPTION

This disclosure is directed to processes and systems that correct receiver motion in seismic data recorded with multicomponent receivers in a marine seismic survey, and that separate wavefields recorded in the seismic data into receiver-motion-corrected upgoing and downgoing wavefields. Processes and systems compute a reverse-time receiver-motion-corrected downgoing pressure wavefield at each location of a static downgoing observation level based on the recorded seismic data and compute a reverse-time receiver-motion-corrected upgoing pressure wavefield at each location of a static upgoing observation level based on the recorded seismic data. The reverse-time receiver-motion-corrected downgoing pressure wavefields are forwarded in time to obtain corresponding receiver-motion-corrected downgoing pressure wavefields at locations of the static downgoing observation level. The reverse-time receiver-motion-corrected upgoing pressure wavefields are forwarded in time to obtain corresponding receiver-motion-corrected upgoing pressure wavefields at locations of the static upgoing observation level. One or both of the receiver-motion-corrected upgoing and downgoing pressure wavefields are extrapolated to locations along a static observation level. For example, the static observation level may be the upgoing observation level, the downgoing observation level, or an observation level located between the upgoing and downgoing observation levels. As a result, the receiver-motion-corrected upgoing and downgoing pressure wavefields are corrected for receiver motion as if wavefield separation had been performed on a pressure wavefield measured by pressure sensors located along the static observation level. Images of subterranean formations, also called "seismic images," are generated based at least in part on the receiver-motion-corrected upgoing pressure wavefield and the receiver-motion-corrected downgoing pressure wavefield. Because the receiver-motion-corrected upgoing and downgoing pressure wavefields are located at the same static observation level, the images generated from the receiver-motion-corrected upgoing and downgoing pressure wavefields are free of adverse effects created by arbitrary depth and time displacement variations in the multicomponent receivers.

Marine Seismic Surveying and Seismic Imaging

Figure 1A:
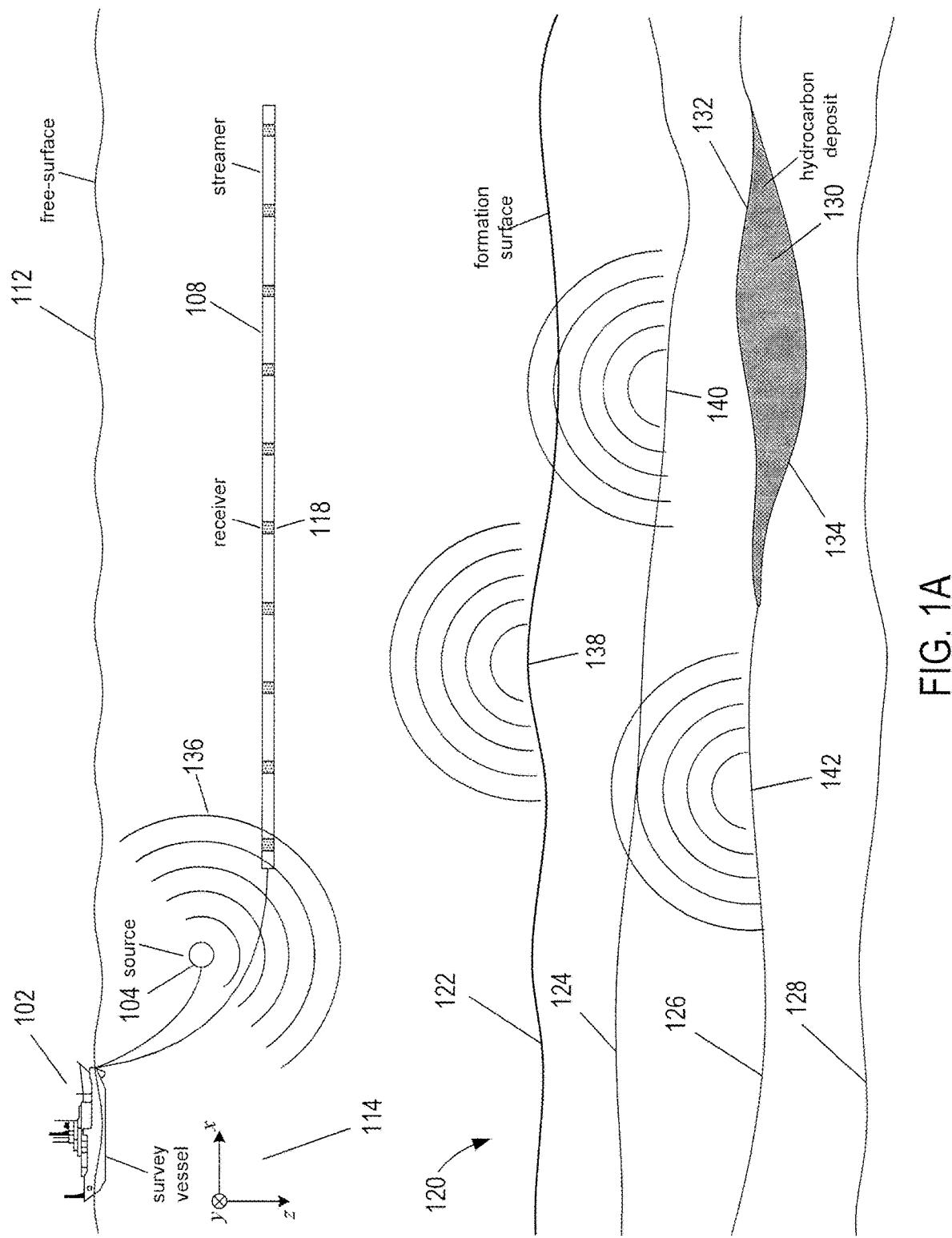
FIGS. 1A-1B show side-elevation and top views of an example seismic data acquisition system.
Figure 1B:
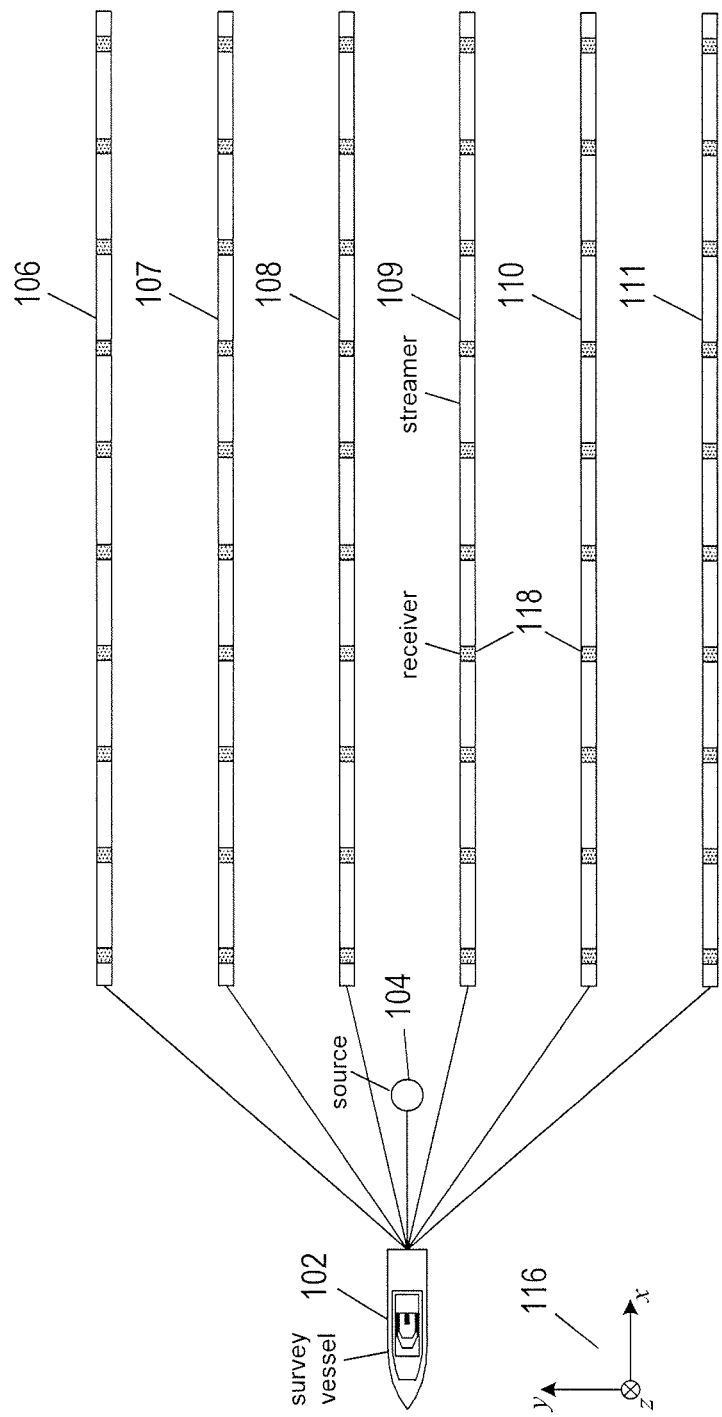

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers or in the direction the survey vessel is traveling and is referred to as the "in-line" direction. The y-direction specifies the position of a point in a direction perpendicular to the x-axis and substantially parallel to the free surface 112 and is referred to as the "cross-line" direction. The z-direction, also referred to as the "depth" direction, specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing a source 104 above a subterranean formation 120. The source 104 may be composed of an array of source elements, such as air guns, that are activated to produce acoustic signal with an impulse (i.e., spike) acoustic signature. Alternatively, the source 104 may be a marine vibrator that when activated produces an acoustic signal with a substantially continuous acoustic signature. Curve 122, the formation surface, represents a top surface of the subterranean formation 120 located at the bottom of the body of water. The subterranean formation 120 may have a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 is activated (i.e., fired or shot) to produce an acoustic signal. In other implementations, the source 104 may be towed by one survey vessel and the streamers may be towed by a different survey vessel. FIG. 1A shows an acoustic signal expanding outward from the source 104 as a pressure wavefield 136 represented by semicircles of increasing radius centered at the source 104. The outwardly expanding wavefronts from the source may be spherical but are shown in vertical plane cross section in FIG. 1A. The outward and downward expanding portion of the pressure wavefield 136 and any portion of the pressure wavefield 136 reflected from the free-surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the acoustic signal primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, waves of significant amplitude may be generally reflected from points on or close to the formation surface 122, such as point 138, and from points on or very close to interfaces in the subterranean formation 120, such as points 140 and 142. The upward expanding waves reflected from the subterranean formation 120 are collectively the "reflected wavefield."

The waves that compose the reflected wavefield may be generally reflected at different times within a range of times following the initial source wavefield. A point on the formation surface 122, such as the point 138, may receive a pressure disturbance from the source wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which waves are reflected from various points within the subterranean formation 120 may be related to the distance, in three-dimensional space, of the points from the activated source 104.

Acoustic and elastic waves may travel at different velocities within different materials as well as within the same material under different pressures. Therefore, the travel times of the source wavefield and reflected wavefield may be functions of distance from the source 104 as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
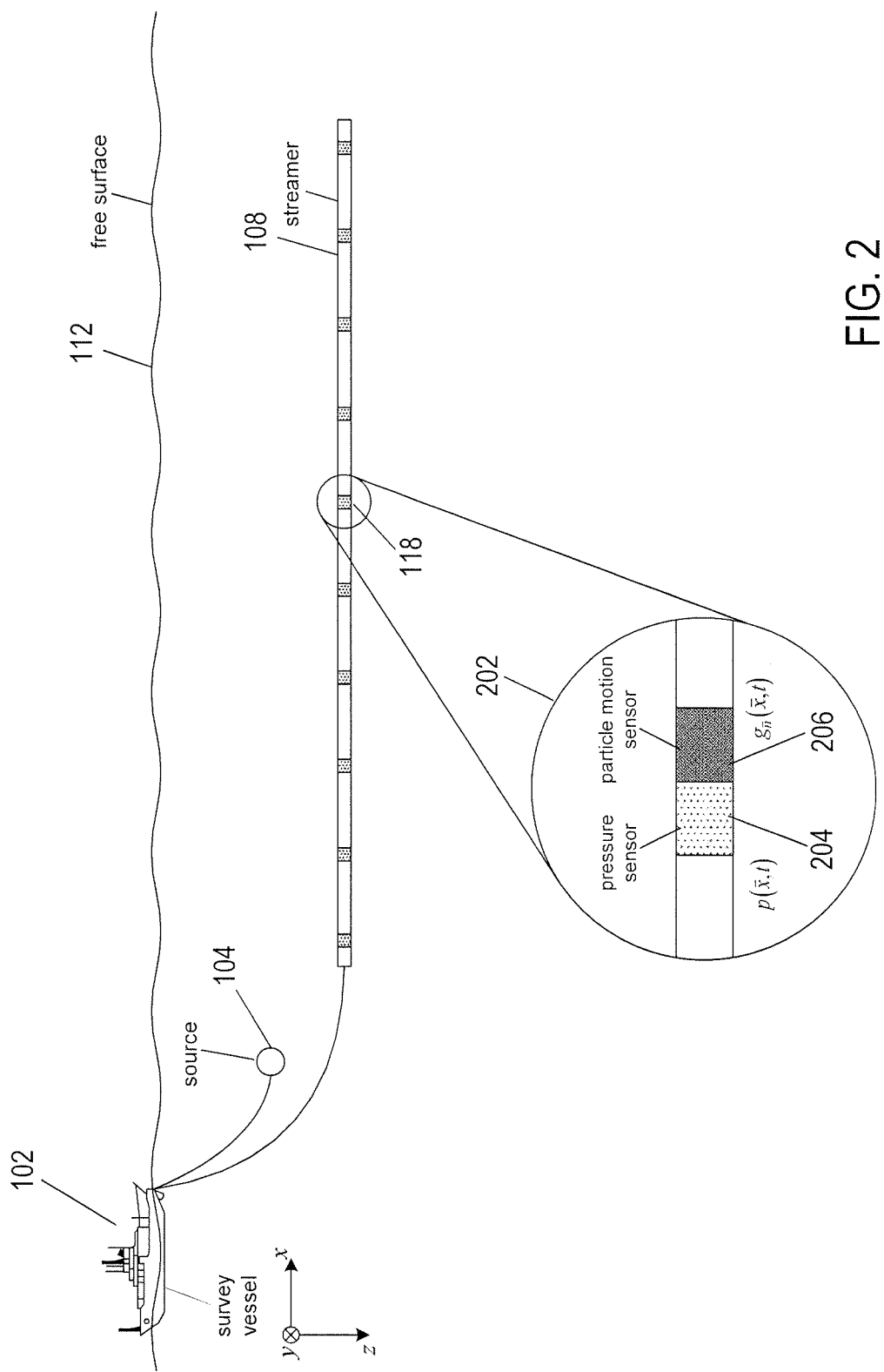
FIG. 2 shows a side-elevation view of a seismic data acquisition system with a magnified view of a receiver.

Each receiver 118 may be a multicomponent sensor including particle motion sensors and a pressure sensor. A pressure sensor detects variations in water pressure over time. The term "particle motion sensor" is a general term used to refer to a sensor that may be configured to detect particle displacement, particle velocity, or particle acceleration over time. FIG. 2 shows a side-elevation view of the marine seismic data acquisition system with a magnified view 202 of the receiver 118. In this example, the magnified view 202 reveals that the receiver 118 is a multicomponent sensor comprising a pressure sensor 204 and a particle motion sensor 206. The pressure sensor may be, for example, a hydrophone. Each pressure sensor is a non-directional sensor that measures changes in hydrostatic pressure wavefield over time to produce pressure wavefield data denoted by p ($\vec{x}$, t), where $\vec{x}$ represents the Cartesian coordinates (x, y, z) of a receiver, and t represents time. Pressure wavefield data is simply referred to as the pressure wavefield. The particle motion sensors may be responsive to water motion. In general, particle motion sensors detect particle motion (i.e., displacement, velocity, or acceleration) in a direction and may be responsive to such directional displacement of the particles, velocity of the particles, or acceleration of the particles. A particle motion sensor that measures particle displacement generates particle displacement data denoted by $g_{\vec{n}}$ ($\vec{x}$, t), where the vector $\vec{n}$ represents the direction along which particle displacement is measured. A particle motion sensor that measures particle velocity (i.e., particle velocity sensor) generates particle velocity wavefield data denoted by $v_{\vec{n}}$($\vec{x}$, t). A particle motion sensor that measures particle acceleration (i.e., accelerometer) generates particle acceleration data denoted by $a_{\vec{n}}$($\vec{x}$, t). The data generated by one type of particle motion sensor may be converted to another type. For example, particle displacement data may be differentiated to obtain particle velocity wavefield data, and particle acceleration data may be integrated to obtain particle velocity wavefield data.

The term "particle motion data" is a general term used to refer to particle displacement data, particle velocity wavefield data, or particle acceleration data. The term "seismic data" refers to pressure wavefield data and/or particle motion data. Particle displacement data represents a particle displacement wavefield, particle velocity wavefield data represents a particle velocity wavefield, and particle acceleration data represents particle acceleration wavefield. The particle displacement, velocity, and acceleration wavefield data are referred to as particle displacement, velocity, and acceleration wavefields.

The particle motion sensors are typically oriented so that the particle motion is measured in the vertical direction (i.e., $\vec{n}$ =(0,0, z)) in which case $g_z$($\vec{x}$, t) is called vertical wavefield displacement data, $v_z$($\vec{x}$, t) is called vertical velocity wavefield, and $a_z(\vec{x}, t)$ is called vertical acceleration wavefield. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}, t)$, each receiver may include a particle motion sensor that measures the wavefield in the in-line direction in order to obtain the in-line velocity wavefield, $v_x(\vec{x}, t)$, and a particle motion sensor that measures the wavefield in the cross-line direction in order to obtain the cross-line velocity wavefield, $v_y(\vec{x}, t)$. In certain implementations, the receivers may be only pressure sensors, and in other implementations, the receivers may be only particle motion sensors. The three orthogonal velocity wavefield sets form a velocity wavefield vector $\vec{v} = (v_x, v_y, v_z)$.

The streamers 106-111 and the survey vessel 102 may include sensing electronics and data-processing facilities that allow seismic data generated by each receiver to be correlated with the time each source of the source 104 is activated, absolute positions on the free surface 112, and absolute three-dimensional positions with respect to an arbitrary three-dimensional coordinate system. The pressure wavefield and particle motion data may be stored at the receiver, and/or may be sent along the streamers and data transmission cables to the survey vessel 102, where the data may be stored electronically or magnetically on data-storage devices located onboard the survey vessel 102 and/or transmitted onshore to a seismic data-processing facility.

Each pressure sensor and particle motion sensor may include an analog-to-digital converter that converts time-dependent analog signals into discrete time series that consist of a number of consecutively measured values called "amplitudes" separated in time by a sample rate. The time series data generated by a pressure or particle motion sensor is called a "trace," which may consist of thousands of samples collected at a typical sample rate of about 1 to 5 samples per millisecond. A trace is a recording of a subterranean formation response to acoustic energy that passes from an activated source, into the subterranean formation where a portion of the acoustic energy is reflected and/or refracted, and ultimately detected by a sensor as described above. Each trace records variations in time-dependent amplitudes that corresponds to fluctuations in acoustic energy of the wavefield measured by the sensor. In general, each trace is an ordered set of discrete spatial and time-dependent pressure or motion sensor amplitudes denoted by:

$$tr(\vec{x}, t) = \{A(\vec{x}, t_j)\}_{j=0}^{J-1} \quad (1)$$

where tr represents pressure, particle displacement, particle velocity, or particle acceleration amplitude;

A represents amplitude;

$t_j$ is the j-th sample time; and

J is the number of time samples in the trace.

The coordinate location $\vec{x}$ of each receiver may be calculated from global position information obtained from one or more global positioning devices located along the streamers and depth measuring devices, such as hydrostatic pressure sensors, and the known geometry and arrangement of the streamers and receivers. The receiver location varies with time and is also denoted by $\vec{x}(t)$ (i.e., $\vec{x} = \vec{x}(t) = (x(t), y(t), z(t))$). Each trace also includes a trace header not represented in Equation (1) that identifies the specific receiver that generated the trace, receiver and source GPS spatial coordinates, receiver depth, and may include time sample rate and the number of time samples.

As explained above, the reflected wavefield typically arrives first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques to obtain information about the structure of the subterranean formation. The traces may be sorted into different domains, such as a common-shot domain, common-receiver domain, common-receiver-station domain, and common-midpoint domain. For example, a collection of traces sorted into the common-shot domain are called a common-shot gather and a collection of traces sorted into common-receiver domain are called a common-receiver gather.

FIGS. 1A, 1B, and 2 show side-elevation and top views of an example seismic data acquisition system that comprises a survey vessel 102 towing a source 104 and six separate streamers 106-111 beneath a free surface 112 of a body of water. The body of water can be, for example, an ocean, a sea, a lake, or a river, or any portion thereof. The illustrated streamers 106-111 form an ideally planar horizontal data acquisition surface with respect to the free surface 112. However, in practice, depths of receivers may vary along the lengths of the streamers due to changing water conditions, such as upwellings, swells, weather, and shifting currents. In other words, in practice, the towed streamers typically undulate because of dynamic conditions of the body of water in which the streamers are submerged.

Figure 3A:
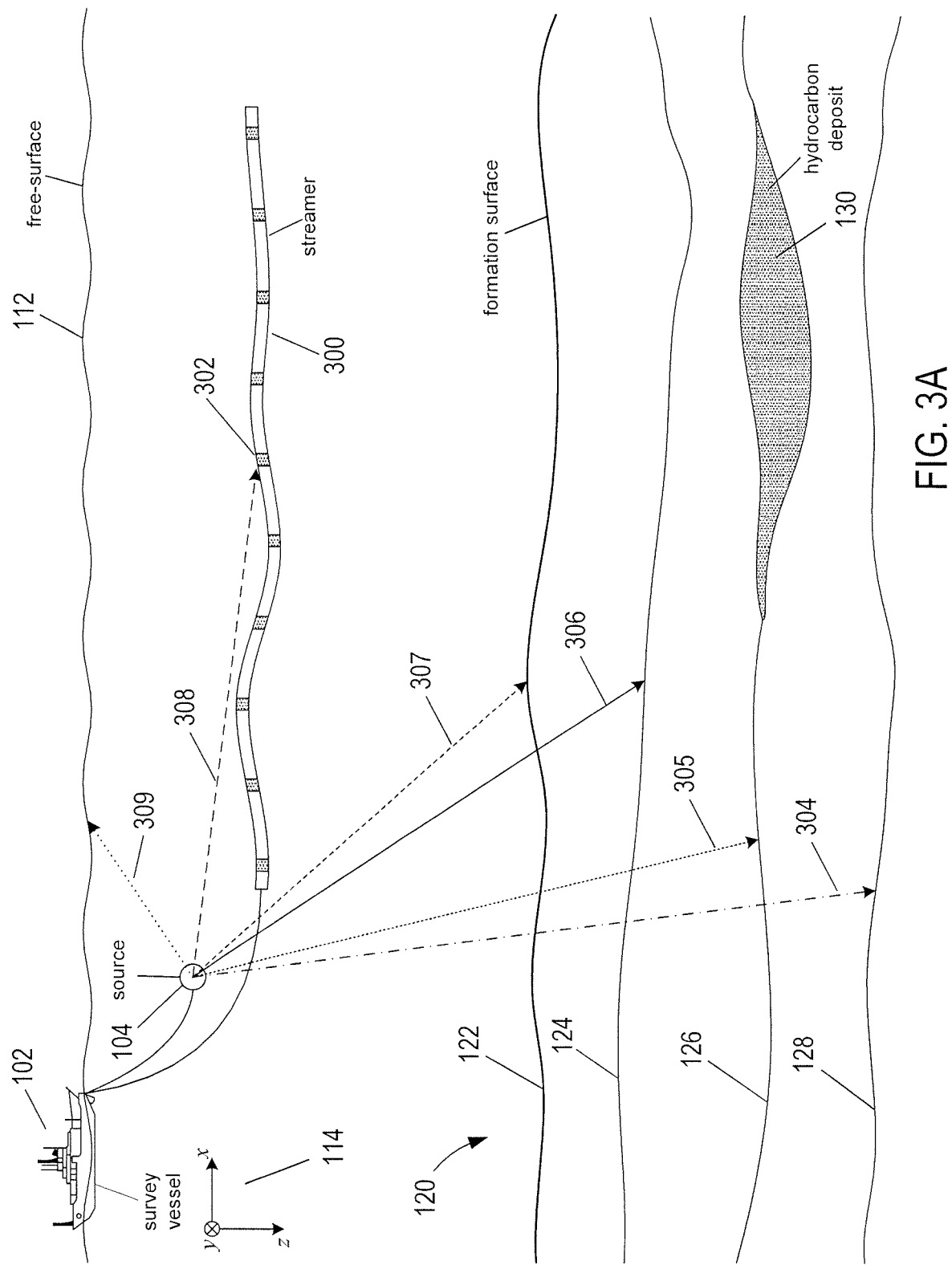
FIGS. 3A-3C show a snapshot of an undulating streamer and different ways in which acoustic energy emitted from a source reverberates between a free surface and a subterranean formation before reaching a receiver.
Figure 3B:
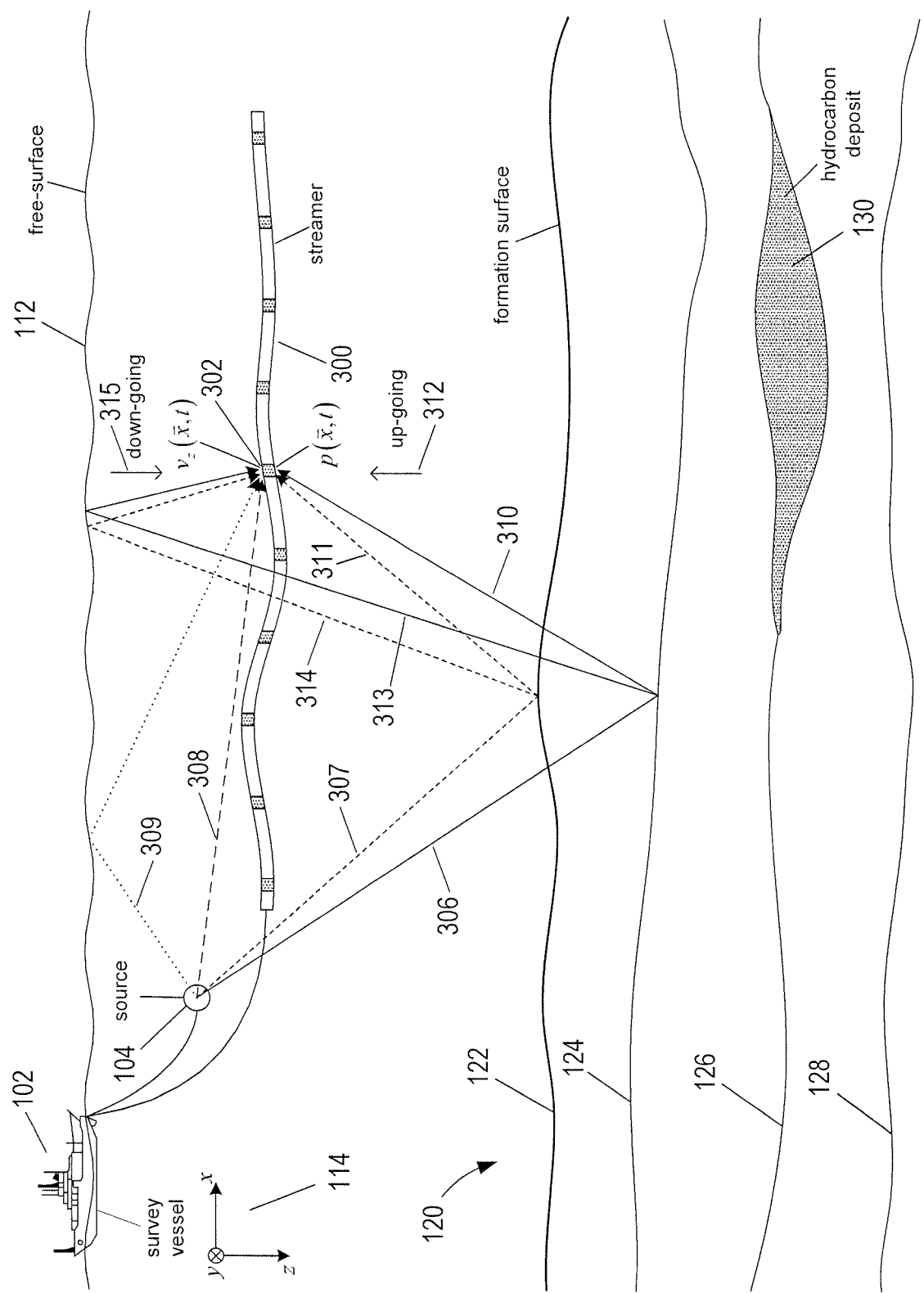
Figure 3C:
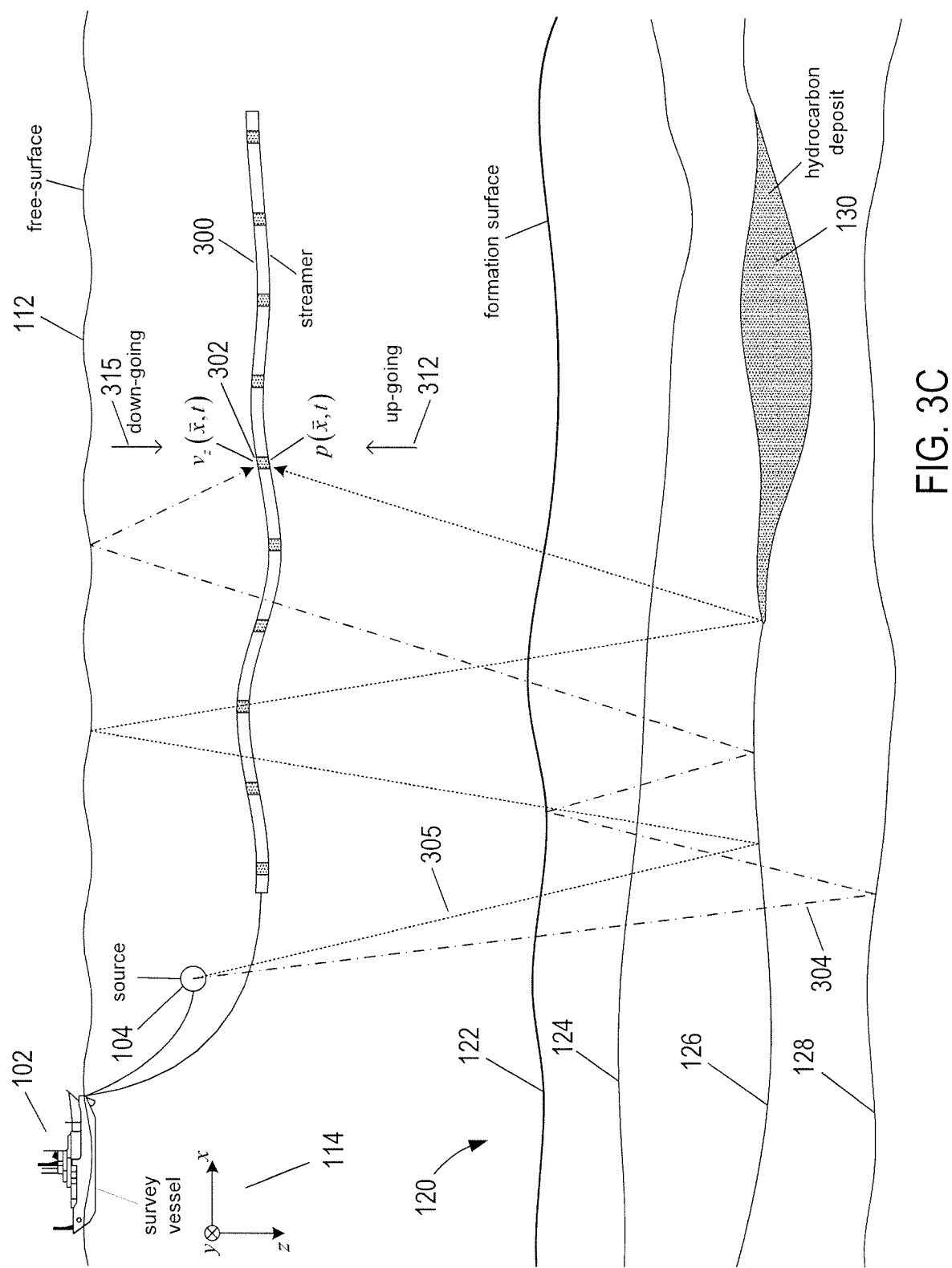

FIGS. 3A-3C show a snapshot of an undulating streamer 300 and different ways in which acoustic energy emitted from the source 104 reverberates between the free surface 112 and the subterranean formation 120 before reaching the receiver 302. The non-linear form of the streamer 300 illustrates how the depths of receivers vary along the length of the streamer 300. As the streamer 300 is towed through the body of water, the depths of the receivers may continue to change. In FIG. 3A, directional arrows 304-309 represent ray paths of different portions of the source signal generated by the source 104. For example, ray paths 304-307 represents portions of the acoustic energy that penetrate to different interfaces of the subterranean formation 102, ray path 308 represents a portion of the acoustic energy that travels directly to the receiver 302, and ray path 309 represents a portion of the acoustic energy that reaches the free surface 112. In FIG. 3B, ray paths 310 and 311 represent reflections from the interface 124 and the formation surface 122 that travel directly to the receiver 302, which are called "upgoing primary reflections" as indicated by upgoing directional arrow 312. Ray paths 313 and 314 represent reflections from the interface 124 and the formation surface 122 followed by reflections from the free surface 112 before traveling directly to the receiver 302, which are called "downgoing reflections" as indicated by directional arrow 315. In FIG. 3C, ray paths 304 and 305 are extended to represent multiple reflections between interfaces within the subterranean formation 120 and the free surface 112. Ray path 304 represent a downgoing multiple as represented by directional arrow 315. Ray path 302 represents an upgoing multiple as represented by directional arrow 312.

Each trace records the primaries and various types of multiples. For example, pressure wavefield $p(\vec{x}, t)$ generated at the receiver 302 records the primary and multiple reflections, and vertical velocity wavefield $v_z(\vec{x}, t)$ also generated at the receiver 302 records the primary and multiple reflections. The pressure wavefield $p(\vec{x}, t)$ and the vertical velocity wavefield $v_z(\vec{x}, t)$ record both upgoing and downgoing pressure and vertical velocity wavefields, respectively, that reach the receiver 302.

Figure 4:
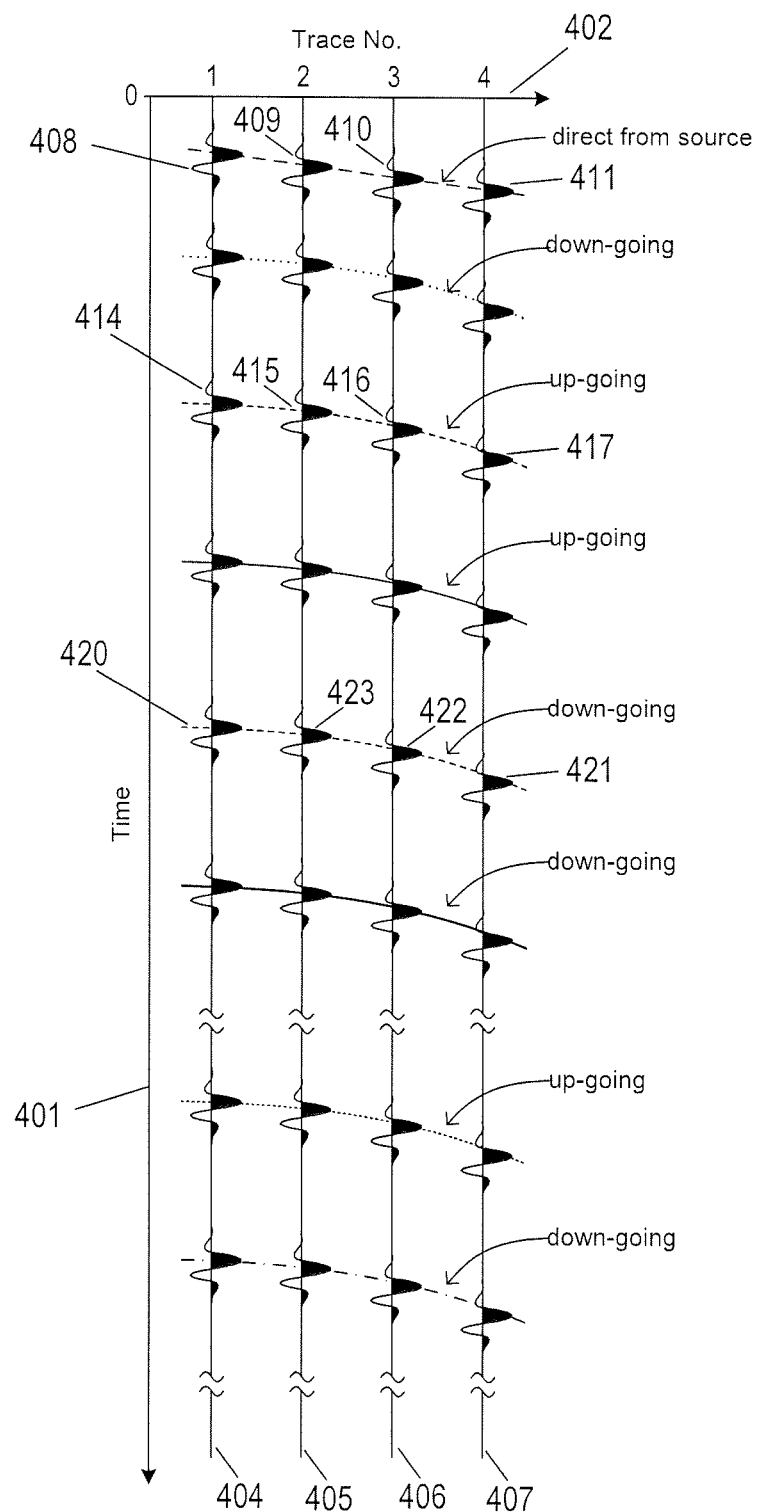
FIG. 4 shows a common-shot gather of a reflected wavefield measured by four adjacent receivers located along a streamer.

FIG. 4 shows an example common-shot gather 400 of four example traces of a reflected wavefield measured by four adjacent receivers located along the streamer 300 shown in FIGS. 3A-3C. Vertical axis 401 represents time. Horizontal axis 402 represents trace numbers with trace "1" representing the seismic data generated by a receiver located closer to the source 104 than trace "4" representing the seismic data generated by a receiver located farther away from the source 104. The distances along the traces 404-407 from time zero to the locations of the wavelets represent the travel times of the acoustic energy output from the source 104 that eventually reaches the receivers located along the streamer 302. The traces 404-407 may represent variation in the amplitude of either the pressure wavefield or the particle motion data measured by four adjacent receivers of the streamer 300. The example traces record events as wavelets located along patterned curves that correspond to the ray paths shown in FIGS. 3A-3C. For example, wavelets 408-411 represent a portion of the acoustic signal generated by the source 104 that travels directly to the receivers as represented by dotted ray path 308 in FIG. 3A. Wavelets 414-417 represent a portion of the acoustic signal that is reflected upward from the formation surface 122 as represented by dashed-line ray path 311 in FIG. 3B. Wavelets 418-421 represent a portion of the acoustic signal that is reflected upward from the formation surface 122 then downward from the free surface 112 as represented by dashed-line ray path 314 in FIG. 3B. In FIG. 4, the events are identified as upgoing and downgoing events and correspond to the upgoing and downgoing ray paths that reach the receiver 302 in FIGS. 3B and 3C.

When seismic data is recorded in favorable water or weather conditions or recorded in short recording time intervals of about 8-12 seconds, conventional wavefield separation and receiver motion correction techniques can be used to compute upgoing and downgoing wavefield components of the pressure wavefield recorded in seismic data. However, when the seismic data is recorded in rough water or weather conditions or recorded in longer recording time intervals, such as recording time intervals greater than about 12 second, displacement of the receivers an ideal linear streamer configuration may vary over time and distance with some receivers reaching maximum streamer displacement variation. Large receiver displacements along undulating streamers cannot be effectively corrected using conventional receiver motion correction techniques. As a result, conventional wavefield separation techniques fail to separate the pressure wavefield into upgoing and downgoing pressure wavefield components. Seismic images produced from such upgoing and downgoing wavefields are distorted and the locations of interfaces in the seismic images are inaccurate and have poor resolution.

Figure 5A:
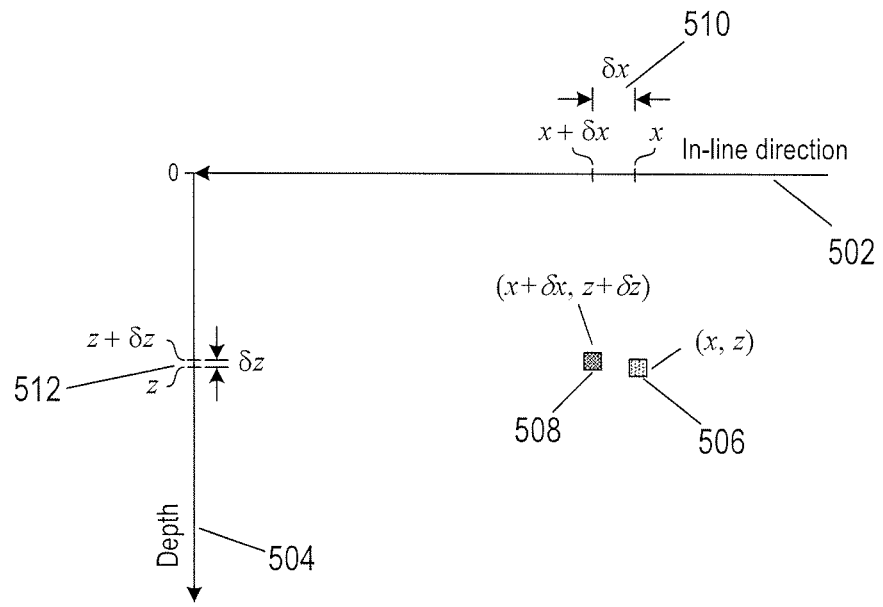
FIGS. 5A-5B show in-line and depth plane views of relative differences in displacements of two receivers.
Figure 5B:
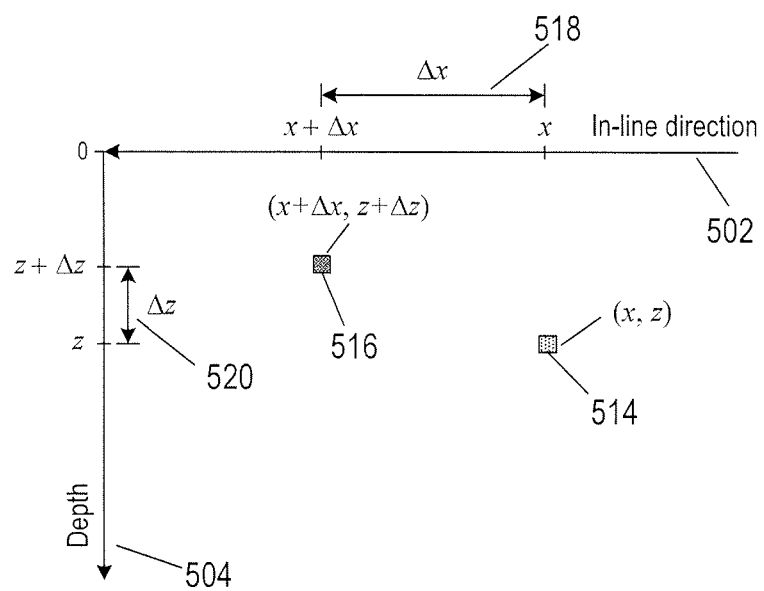

FIGS. 5A-5B show contrasting examples of relative differences in displacements of two receivers towed at the same speed in the in-line direction in short and long recording time intervals, respectively. In FIGS. 5A-5B, directional arrow 502 represents the in-line direction the receivers travel and directional arrow 504 represents depth below the free surface located at depth 0. In FIG. 5A, the short recording time interval may be a typical recording time interval of about 8-12 seconds. Lightly shaded square 506 represents the location of the receiver at depth and in-line direction coordinates (x, z). Dark shaded square 508 represents the location of the first receiver at depth and in-line direction coordinates (x+δx, z+δz) at the end of the short recording time interval, where δx represents in-line displace 510, and δz represents vertical displacement 512 between the receiver locations 506 and 508. In FIG. 5B, the long recording time interval may be the time interval of a marine survey carried out with a marine vibrator (e.g., recording time interval greater than about 40 seconds) or continuous recording (e.g., recording time interval on the order of minutes or hours). Lightly shaded square 514 represents the location of the second receiver at depth and in-line direction coordinates (x, z). Dark shaded square 516 represents the location of the second receiver with depth and in-line direction coordinates (x+Δx, z+Δz) at the end of the long recording time interval, where Δx represents in-line displace 518, and Δz represents vertical displacement 520 between the receiver locations 514 and 516. The vertical displacement δz represents a small or negligible displacement of the first receiver over the short recording time interval as compared to the larger vertical displacement Δz over the long recording time interval. A small or negligible displacement does not impact wavefield separation and subsequently generated seismic images. By contrast, with a long recording time interval, the receivers have greater depth variation, which adversely impacts wavefield separation and subsequently generated seismic images.

Figure 6:
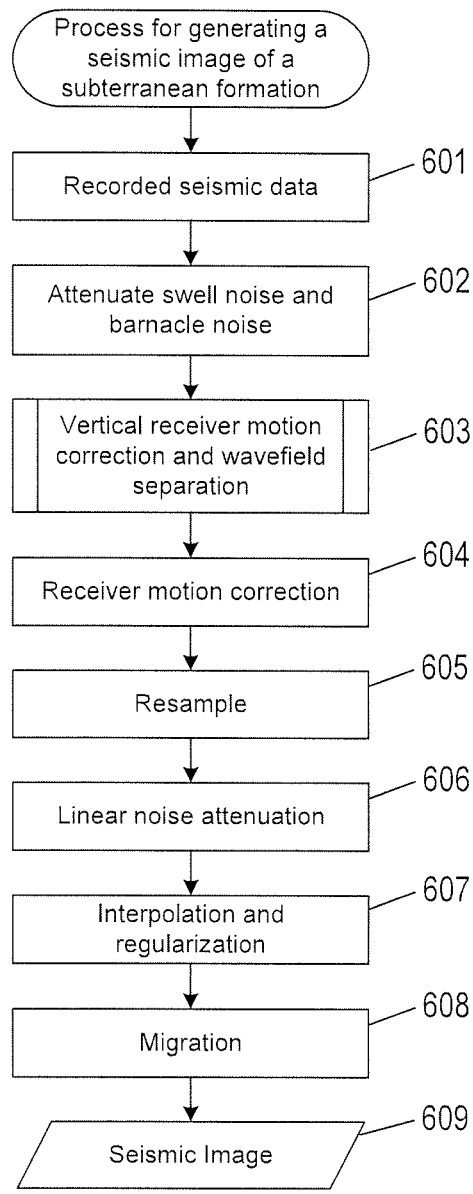
FIG. 6 shows a process for generating an image of a subterranean formation from recorded seismic data collected in a marine seismic survey of the subterranean formation.

Processes and systems described below combine receiver motion correction and wavefield separation for seismic data recorded with depth-varying multicomponent streamers. FIG. 6 shows a process for generating a seismic image of a subterranean formation from recorded seismic data collected in a marine seismic survey of the subterranean formation. Each block represents a different module of computer implemented machine-readable instructions stored in one or more data-storage devices and executed using one or more processors of computer system. It should be noted that the series of modules represented in FIG. 6 is not an exhaustive list of the modules used to compute an image of a subterranean formation from recorded seismic data. Processing of recorded seismic data to generate an image of a subterranean formation may include additional modules or certain modules may be omitted or placed in a different ordering, depending on, for example, how the recorded seismic data is collected, conditions under which the recorded seismic data is collected, and depth of the body of water above the subterranean formation.

In FIG. 6, block 601 represents recording seismic data as described above with reference to FIGS. 1A-3. The recorded seismic data may be pressure and particle motion data recorded using receivers configured with collocated pressure and particle motion sensors. In block 602, swell noise and barnacle noise in the recorded seismic data is attenuated. In block 603, the process of receiver motion correction and wavefield separation is applied to obtain upgoing and downgoing pressure wavefield as described below to obtain receiver-motion-corrected upgoing and downgoing pressure wavefields. The upgoing pressure wavefield represents pressure wavefields traveling upward from the subterranean formation toward the receivers. The downgoing pressure wavefield represents pressure wavefields reflected downward from the free surface toward to the receivers. The receiver-motion-corrected upgoing and downgoing pressure wavefields obtained in block 603 are corrected for receiver motion as if wavefield separation had been performed on a pressure wavefield measured by pressure sensors located along a flat horizontal static observation level located below the free surface. In block 604, the receiver-motion-corrected upgoing and downgoing pressure wavefields are resampled. For example, the traces of receiver-motion-corrected upgoing pressure wavefield may be resampled to have the same sampling rate, such as a sample rate of 4 data points per millisecond. In block 605, linear noise in the resampled data is attenuated by modeling linear noise in the seismic data followed by subtracting the modeled linear noise from the resampled data. Because the receivers undulate during seismic data recording, the in-line and cross-line receiver locations of the traces may be irregularly spaced during recording of the seismic data. In block 606, regularization and interpolation may be applied to regularize and interpolate missing data. Regularization corrects irregularly spaced receiver locations in the in-line and cross-lines coordinates of the traces to points of a regularly spaced grid of receiver locations in the in-line and cross-line coordinate plane. Interpolation replaces corrupted traces or fills in traces of receiver-motion-corrected upgoing and downgoing pressure wavefield at regular grid points, such as interpolating traces in the cross-line direction where receivers are spaced farther apart than in the in-line direction. Even after wavefield separation has been applied, the upgoing pressure wavefield may record other sea surface effects, such as the source ghost and the free-surface multiples that arrive at the receivers as upgoing wavefields as represented by ray path 305 in FIG. 3C. The downgoing wavefield can be used to attenuate the source ghost and the free-surface multiples to obtain the receiver-motion-correction upgoing pressure wavefield that records subsurface reflections without source ghost and free-surface multiples. In block 607, migration is applied to the upgoing pressure wavefield in either the space-time coordinate system (i.e., time migration) or Cartesian coordinate system (i.e., depth migration) to obtain an image of the subterranean formation 608.

Processes and systems that combine receiver motion correction and wavefield separation to obtain receiver-motion-corrected upgoing and downgoing pressure wavefields executed in block 603 of FIG. 6 are now described. FIGS. 7 and 8 illustrate physical and free-space virtual states, respectively, that introduce parameters used to describe computation of a receiver-motion-corrected downgoing pressure wavefield. FIGS. 10 and 11 illustrate physical and free-space virtual states, respectively, that introduce parameters used to describe computation of a receiver-motion-corrected upgoing pressure wavefield.

Figure 7A:
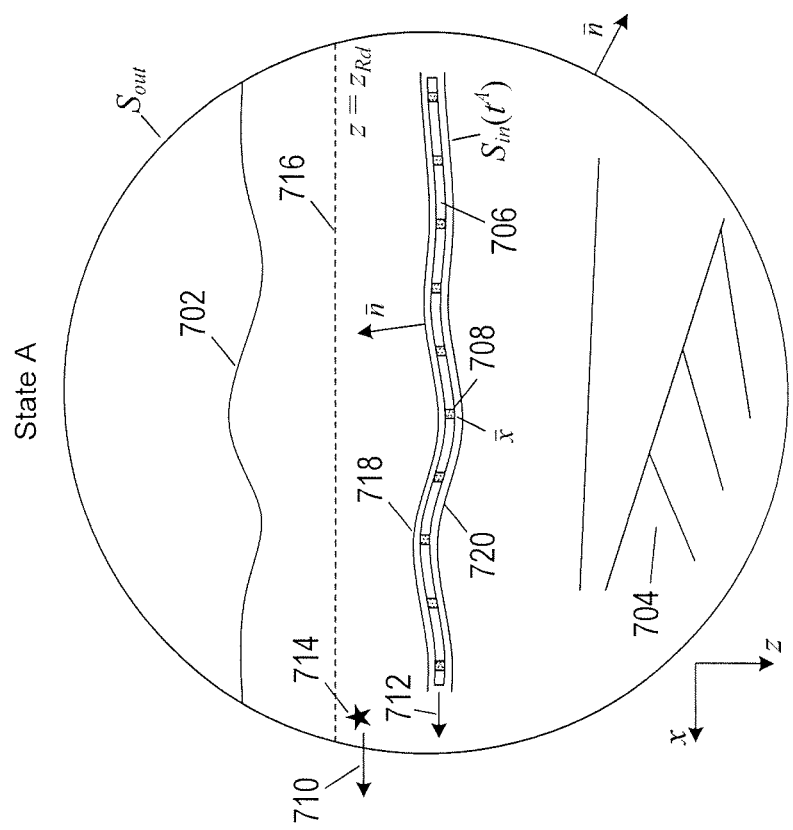
FIG. 7A shows an in-line direction and depth plane view of a physical state.

FIG. 7A shows an in-line direction and depth plane view of a physical state denoted by A. In FIG. 7A, a circular outer surface denoted by $S_{out}$ encloses a representation of the free surface 702 of a body of water located above a subterranean formation 704. The circular outer surface $S_{out}$ also encloses a representation of a depth-varying multicomponent streamer 706 having numerous multicomponent receivers represented by shaded squares, such as shaded square 708. Each multicomponent receiver includes a pressure sensor and a particle motion sensor at each receiver location, as described above with reference to FIG. 2. The receiver location varies with time and is denoted by $\vec{x} = \vec{x}(t)$, as described above with reference to Equation (1). Directional arrows 710 and 712 represent the forward direction a source 714 and the streamer 706 travel through the body of water below the free surface 702. Dashed line 716 represents a static downgoing observation level located in the horizontal xy-plane at a constant depth $z_{R_d}$ between the free surface 702 and the shallowest receiver of the streamer 706. Curves 718 and 720 represent upper and lower surfaces of an inner surface denoted by $S_{in}(t^A)$ that encloses the streamer 706, where $t^A$ represents time in the physical state A. In physical state A, it is assumed that there are no active sources and that wavefields are zero everywhere outside the location of the moving streamer 706.

Let $p_t^A(\vec{x}, t^A)$ represent the pressure wavefield and $\vec{v}^A(\vec{x}, t^A) = (v_x^A(\vec{x}, t^A), v_y^A(\vec{x}, t^A), v_z^A(\vec{x}, t^A))$ represent the velocity vector wavefield measured by collocated pressure and particle motion sensors of a receiver of the streamer 706. The three components of the velocity vector wavefield measured at each receiver location are used to determine the gradient in the pressure wavefield at each receiver. The velocity vector wavefield is transformed from the space-time domain to the space-frequency domain:

$$\vec{v}^A(\vec{x}, t^A) \rightarrow \vec{V}^A(\vec{x}, \omega) \qquad (2)$$

where $\omega$ is the angular frequency of the particle velocity wavefield.

The velocity vector wavefield may be transformed from the space-time domain to the space-frequency domain using a discrete Fourier transform ("DFT") or a fast Fourier transform ("FFT"). The gradient of the pressure wavefield at the receiver location $\vec{x}$ in the space-frequency domain is given by:

$$\nabla p_t^A(\vec{x}, \omega) = -i\rho\omega \vec{V}^A(\vec{x}, \omega) \qquad (3)$$

where $$\nabla = \left(\frac{\partial}{\partial x}, \frac{\partial}{\partial y}, \frac{\partial}{\partial z}\right)$$

is the gradient operator.

The gradient of the pressure wavefield is transformed from the space-frequency domain to the space-time domain to obtain the gradient of the pressure wavefield in the space-time domain of the physical state A:

$$\nabla p_t^A(\vec{x}, \omega) \rightarrow \nabla p_t^A(\vec{x}, t^A) \qquad (4)$$

The gradient of the pressure wavefield may be inverse transformed from the space-frequency domain to the space-time domain using an inverse DFT or an inverse FFT.

The recorded pressure wavefield and the gradient of the pressure wavefield at each receiver location are time reversed. FIG. 7B shows examples of ray paths 722-724 of an acoustic signal that travels from the source 714 to the receivers 708 and 726. Ray path 722 represents down-ward acoustic energy reflected from the free surface 702. Ray paths 723-724 represent up-ward acoustic energy reflected from an interface within the subterranean formation 704.

Figure 7C:
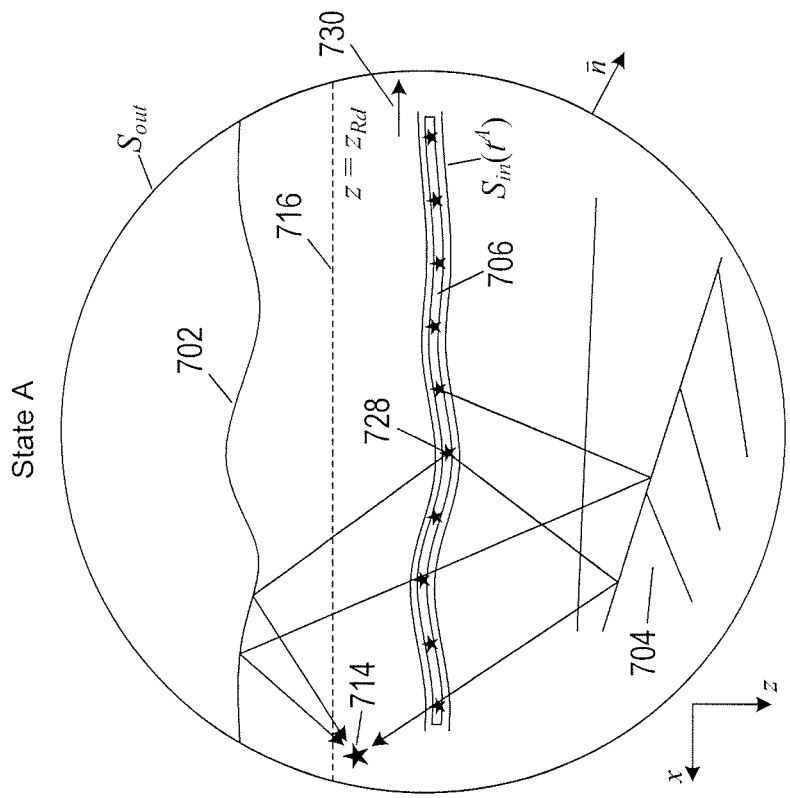
FIG. 7C shows reverse-time ray paths of acoustic signals that travel from sources located along a streamer back to a source of the physical state.
Figure 7B:
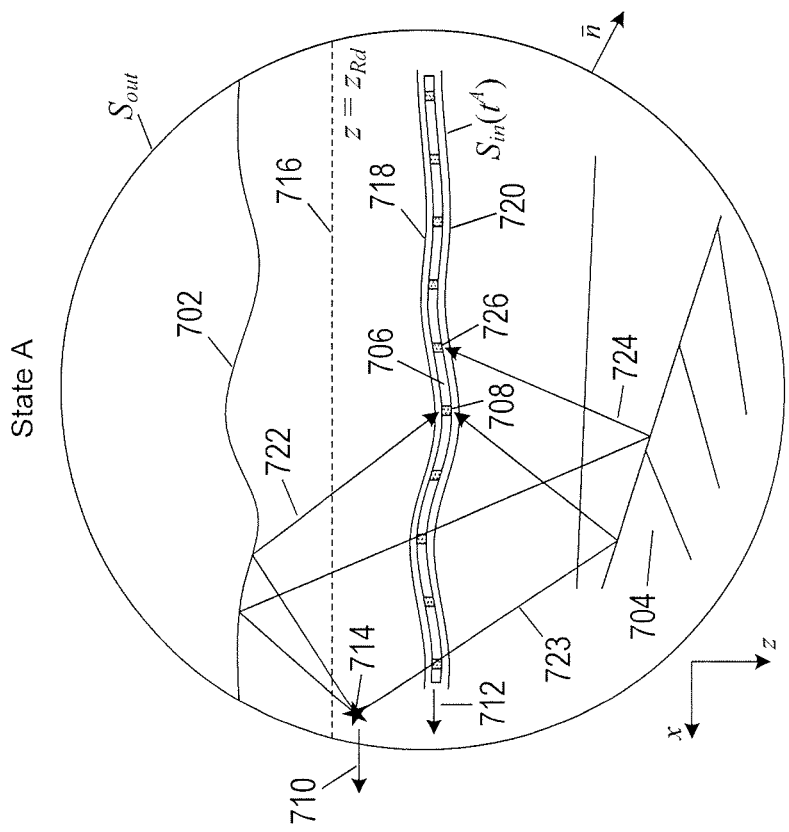
FIG. 7B shows examples of ray paths of an acoustic signal that travels from a source to the receivers of a streamer of the physical state.

FIG. 7C shows the measured and reverse-time pressure and gradient pressure wavefields as virtual monopole and dipole sources located along a streamer 706. Reversing time t is represented by reverse-time ray paths of acoustic signals that travel from sources located along a streamer 706 back to the source 704. Reversing time is equivalent to replacing $t^A$ by $T_{max} - t^A$ for every receiver, where $T_{max}$ is a maximum recording time of a seismic data recording time interval $[0, T_{max}]$. Virtual sources are represented by stars along the streamer 706. For example, star 728 represents a virtual source that replaces the receiver 708 in FIG. 7B. In reverse time, the streamer 706 travels in the opposite direction, as represented by directional arrow 730.

A reverse-time recorded pressure wavefield and a reverse-time gradient of the pressure wavefield are given by:

$$\tilde{p}_t^A(\vec{x}, t^A) = p_t^A(\vec{x}, T_{max} - t^A) \qquad (5a)$$

$$\nabla \tilde{p}_t^A(\vec{x}, t^A) = \nabla p_t^A(\vec{x}, T_{max} - t^A) \qquad (5b)$$

where "~" denotes reverse time.

Figure 8A:
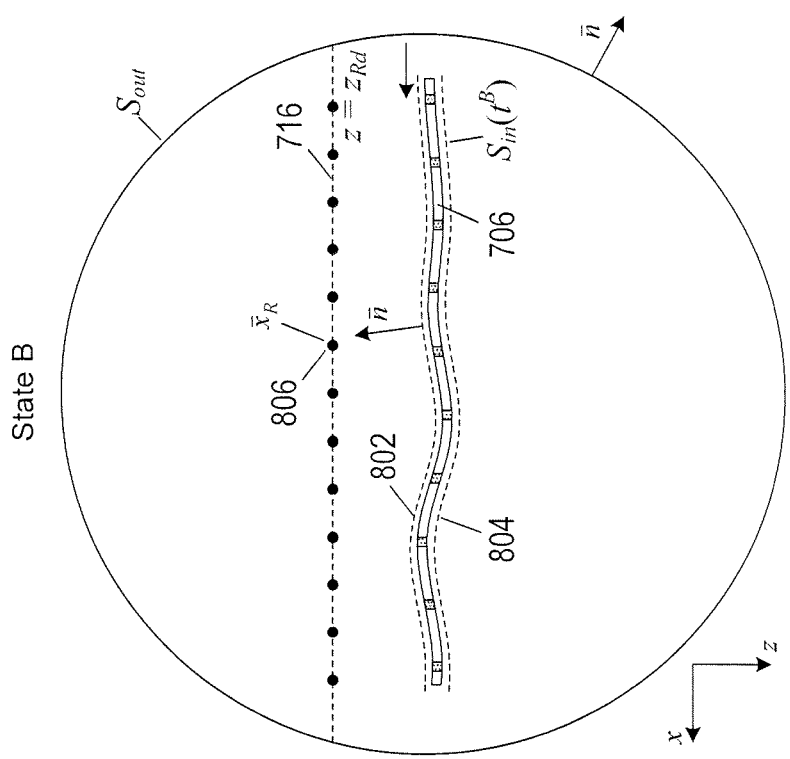
FIG. 8A shows an in-line direction and depth plane view of a free-space virtual state.

FIG. 8A shows an in-line direction and depth plane view of a free-space virtual state denoted by B. In FIG. 8A, circular outer surface $S_{out}$ encloses the streamer 706 and a downgoing observation level 716. Dashed curves 802 and 804 represent upper and lower surfaces of an inner surface denoted by $S_{in}(t^B)$ that encloses the streamer 706, where $t^B$ represents time in the free-space virtual state B. Solid dots represent fixed space-apart locations along the downgoing observation level 716. For example, solid dot 806 represents a location of the downgoing observation level 716 with coordinates denoted by $\vec{x}_{Rd}=(x_R, y_R, z_{Rd})$. Locations along the downgoing observation are located at the same depth $z_{Rd}$.

In the free-space virtual state B, a monopole source is conceptually located at each location $\vec{x}_{Rd}$ of the downgoing observation level 716. Each monopole source generates an acoustic impulse with a pressure wavefield denoted by $p_t^B(\vec{x}, t^B; \vec{x}_{Rd}, t_s)$, where $t_s$ represents the time at which the pressure wavefield is generated by the monopole source, ($\vec{x}_{Rd}, t_s$) represents the coordinate location of the monopole source at time $t_s$, and ($\vec{x}, t^B$) represents the coordinate location $\vec{x}$ of a receive along the streamer 706 at the time $t^B$.

Figure 8C:
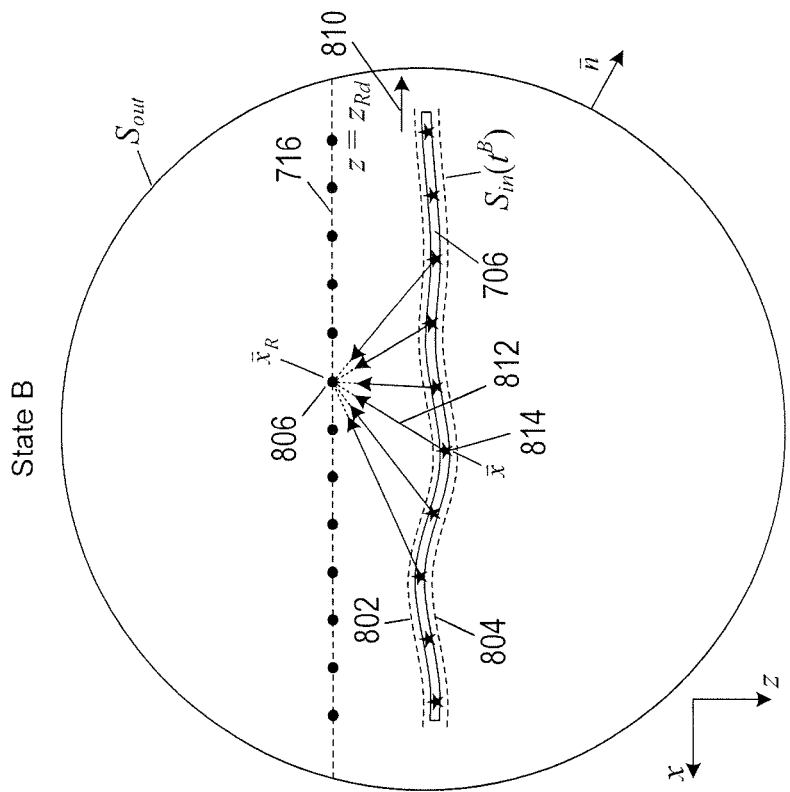
FIG. 8C shows ray paths of acoustic signals that propagate from monopole sources located along a streamer to a downgoing observation level location of the free-space virtual state.
Figure 8B:
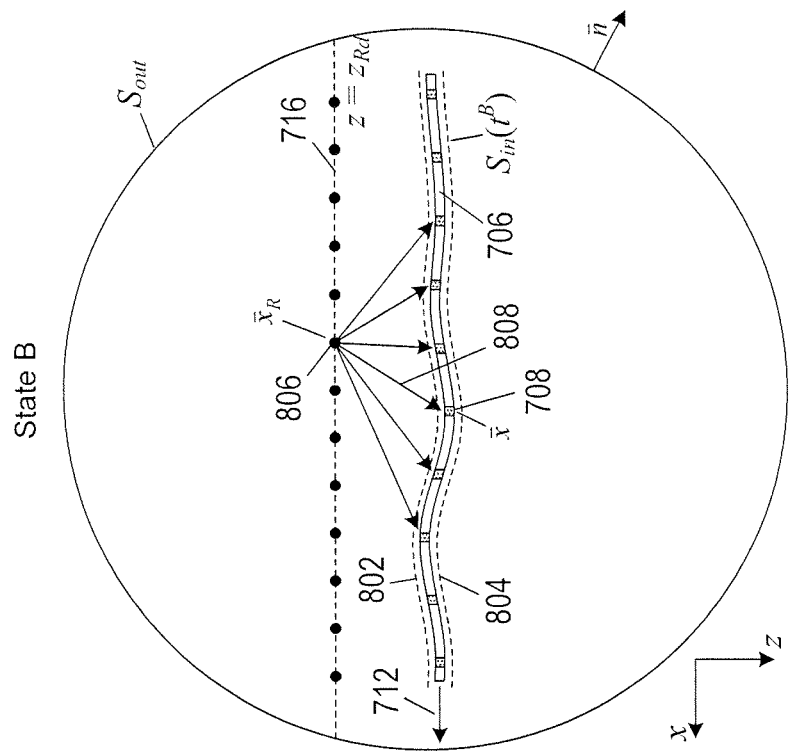
FIG. 8B shows ray paths of an acoustic signal that propagates from a monopole source at a downgoing observation level location to receivers of a streamer of the free-space virtual state.

FIG. 8B shows ray paths of impulsive acoustic energy that propagate from a monopole source at a location 806 of the downgoing observation level 716 to receivers of the streamer 706. For example, ray path 808 represents impulsive acoustic energy that travels directly from the monopole source 806 to the receiver 708. The impulsive acoustic energy travels from the monopole sources as the streamer 706 moves in the forward direction indicated by directional arrow 712.

A monopole source pressure wavefield that travels from a monopole source to a receiver location of the streamer 706 is represented by a Green's function:

$$p_t^B(\vec{x}, t^B; \vec{x}_{Rd}, t_s) = \frac{\delta(t^B - t_s - r_d/c)}{4\pi r_d} \quad (6a)$$

where $\delta(t^B - t_s - r_d/c)$ is a Dirac delta function;

c is the speed of sound in the body of water; and $r_d = \sqrt{(x-x_R)^2 + (y-y_R)^2 + (z-z_{Rd})^2}$.

The Green's function is a model of impulsive acoustic energy output from a monopole source as a function of distance between the location $\vec{x}_{Rd}$ of the monopole source along the downgoing observation level and a receiver location $\vec{x}$ of the streamer 706. A gradient of the monopole source pressure wavefield that travels from a monopole source to a receiver location of the streamer is represented as follows:

$$\nabla p_t^B(\vec{x}, t^B; \vec{x}_{Rd}, t_s) = \nabla \left( \frac{\delta(t^B - t_s - r_d/c)}{4\pi r_d} \right) \quad (6b)$$

The reverse-time pressure wavefield and reverse-time gradient of the pressure wavefield of the physical state A and the monopole source pressure wavefield and gradient of the monopole source pressure wavefield of free-space virtual state B are summarized in Table I as follows:

TABLE I

| | Physical State A | Free-space virtual State B |
|---|---|---|
| Wavefield | $\tilde{p}_t^A(\vec{x}, t^A) \neq 0$ for $\vec{x} \in S_{in}(t^A)$<br>$\nabla \tilde{p}_t^A(\vec{x}, t^A) \neq 0$ for $\vec{x} \in S_{in}(t^A)$<br>$\tilde{p}_t^A(\vec{x}, t^A) = \nabla \tilde{p}_t^A(\vec{x}, t^A) = 0$<br>for $\vec{x} \notin S_{in}(t^A)$ | $p_t^B(\vec{x}, t^B; \vec{x}_{Rd}, t_s)$<br>$\nabla p_t^B(\vec{x}, t^B; \vec{x}_{Rd}, t_s)$ |
| Source | | $\delta(t^B - t_s)\delta(\vec{x} - \vec{x}_{Rd})$ |

Applying the acoustic reciprocity theorem to the wavefields in physical state A and the free-space virtual state B (See e.g., *Seismic Applications of Acoustic Reciprocity*, by J. T Fokkema and P. M. van den Berg, pp. 95-103, Elsevier Science 1993) gives the following integral representation:

$$\int_V \tilde{p}_t^A(\vec{x}, t^A)\delta(t^B - t_s)\delta(\vec{x} - \vec{x}_{Rd})dV + \quad (7)$$

$$\int_V \left[ \frac{1}{c^2} \left( \tilde{p}_t^A(\vec{x}, t^A) \frac{\partial^2 p_t^B(\vec{x}, t^B; \vec{x}_{Rd}, t_s)}{(\partial t^B)^2} - \right. \right.$$

$$\left. \left. p_t^B(\vec{x}, t^B; \vec{x}_{Rd}, t_s) \frac{\partial^2 \tilde{p}_t^A(\vec{x}, t^A)}{(\partial t^A)^2} \right) \right] dV =$$

$$\int_S [\tilde{p}_t^A(\vec{x}, t^A) \nabla p_t^B(\vec{x}, t^B; \vec{x}_{Rd}, t_s) - p_t^B(\vec{x}, t^B; \vec{x}_{Rd}, t_s) \nabla \tilde{p}_t^A(\vec{x}, t^A)] \cdot \vec{n} dS$$

where $S = S_{out} + S_{in}$ is the outer surface $S_{out}$ and the inner surface $S_{in}$;

$V = V_{out} - V_{in}$ is the volume enclosed by the outer surface $S_{out}$ minus the volume enclosed by the inner surface $S_{in}$; and $\vec{n}$ is the outward normal vector to the outer surface $S_{out}$ and the inner surface $S_{in}$ shown in FIGS. 7 and 8.

Solving the volume integral of the source term in Equation (7) and applying the Sommerfeld radiation condition (See e.g., *Optics lectures on theoretical physics*, Vol. IV., by A. Sommerfeld, New York, Academic Press Inc., 1954) on the surface integral S in Equation (7) as the radius of S approaches infinity gives:

$$\tilde{p}_t^A(\vec{x}_{Rd}, t^A)\delta(t^B - t_s) + \quad (8)$$

$$\int_V \left[ \frac{1}{c^2} \left( \tilde{p}_t^A(\vec{x}, t^A) \frac{\partial^2 p_t^B(\vec{x}, t^B; \vec{x}_{Rd}, t_s)}{(\partial t^B)^2} - p_t^B(\vec{x}, t^B; \vec{x}_{Rd}, t_s) \right. \right.$$

$$\left. \left. \frac{\partial^2 \tilde{p}_t^A(\vec{x}, t^A)}{(\partial t^A)^2} \right) \right] dV =$$

$$\int_{S_{in}} [\tilde{p}_t^A(\vec{x}, t^A) \nabla p_t^B(\vec{x}, t^B; \vec{x}_{Rd}, t_s) - p_t^B(\vec{x}, t^B; \vec{x}_{Rd}, t_s) \nabla \tilde{p}_t^A(\vec{x}, t^A)] \cdot \vec{n}$$

$$dS$$

Applying source-receiver reciprocity to the monopole source pressure wavefield and the gradient of the monopole source pressure in the free-space virtual state B gives a reverse-time monopole source pressure wavefield in the free-space virtual state B:

$$\tilde{p}_t^B(\vec{x}_{Rd}, t^B - t_s; \vec{x}, 0) = \tilde{p}_t^B(\vec{x}_{Rd}, t - \tau; \vec{x}, 0) = \frac{\delta(t - \tau + r_d/c)}{4\pi r_d} \quad (9a)$$

and gives the reverse-time gradient of the monopole source pressure wavefield:

$$\nabla \tilde{p}_t^B(\vec{x}_{Rd}, t^B - t_s; \vec{x}, 0) = \nabla \tilde{p}_t^B(\vec{x}_{Rd}, t - \tau; \vec{x}, 0) = \nabla\left(\frac{\delta(t - \tau + r_d/c)}{4\pi r_d}\right) \quad (9b)$$

where $t = t^A + t^B - t_s;$ and $\tau = t^A.$

With source-receiver reciprocity, time is reversed in the free-space virtual state B. The receivers located along the streamer 706 are replaced by monopole sources. The monopole sources located along the downgoing observation level 716 are replaced by receivers.

FIG. 8C shows ray paths of impulsive acoustic energy that propagates from monopole sources located at receiver locations of the streamer 716 to a location 806 along the downgoing observation level 716, as the streamer 706 moves in the reverse direction represented by directional arrow 810. For example, ray path 812 represents time-reversed impulsive acoustic energy that travels directly from the monopole source 814 at the location $\vec{x}$ of the streamer 706 to the location $\vec{x}_{Rd}$ 806.

Substituting the reverse-time monopole source pressure wavefield and gradient of the reverse-time monopole source pressure wavefield of Equations (9a) and (9b) into Equation (8) gives:

$$\tilde{p}_t^A(\vec{x}_{Rd}, t^A)\delta(t^B - t_s) + \int_V \left[\frac{1}{c^2}\left(\tilde{p}_t^A(\vec{x}, t^A)\frac{\partial^2 \tilde{p}_t^B(\vec{x}_{Rd}, t^B - t_s; \vec{x}, 0)}{(\partial t^B)^2} - \tilde{p}_t^B(\vec{x}_{Rd}, t^B - t_s; \vec{x}, 0)\frac{\partial^2 \tilde{p}_t^A(\vec{x}, t^A)}{(\partial t^A)^2}\right)\right]dV = \int_{S_{in}} [\tilde{p}_t^A(\vec{x}, t^A)\nabla \tilde{p}_t^B(\vec{x}_{Rd}, t^B - t_s; \vec{x}, 0) - \tilde{p}_t^B(\vec{x}_{Rd}, t^B - t_s; \vec{x}, 0)\nabla \tilde{p}_t^A(\vec{x}, t^A)] \cdot \vec{n} dS_{in}$$ (10)

Substituting $t = t^A + t^B - t_s$ and $\tau = t^A$ into Equation (10) followed by integrating over time $\tau$ from $-\infty$ to $\infty$ gives an integral representation of the reverse-time receiver-motion-corrected downgoing pressure wavefield at a location $\vec{x}_{Rd}$ of the downgoing observation level 716 and at time sample t as follows:

$$\tilde{p}_t^A(\vec{x}_{Rd}, t)^{down} = \int_{-\infty}^{\infty} \int_{S_{in}(\tau)} [\tilde{p}_t^A(\vec{x}, \tau)\nabla \tilde{p}_t^B(\vec{x}_{Rd}, t-\tau; \vec{x}, 0) - \tilde{p}_t^B(\vec{x}_{Rd}, t-\tau; \vec{x}, 0)\nabla \tilde{p}_t^A(\vec{x}, \tau)] \cdot \vec{n} \, dS_{in} d\tau$$ (11)

The inner surface integral is the pressure wavefield output from the streamer 706 to the location $\vec{x}_{Rd}$ of the downgoing observation level 716 at time $\tau$. The outer time integral over all time $\tau$ represents the pressure wavefield output from the streamer 706 to the location $\vec{x}_{Rd}$ of the downgoing observation level 716 for all time.

In practice, the time $\tau$ in Equation (11) is limited to discrete time samples in the recording time interval [0, $T_{max}$]. In addition, as displayed in Table I above, the pressure wavefields $\tilde{p}_t^A(\vec{x}, t^A)$ and $\nabla \tilde{p}_t^A(\vec{x}, t^A)$ are zero except for receivers located along the streamer 706. As a result, computation of the reverse-time receiver-motion-corrected downgoing pressure wavefield at the location $\vec{x}_{Rd}$ of the downgoing observation level 716 and time sample t may be performed using the following double summation:

$$\tilde{p}_t^A(\vec{x}_{Rd}, t)^{down} \approx \Delta t \Delta x \Delta y \sum_{\tau=0}^{T_{max}} \sum_{\vec{x} \in S_{in}(\tau)} [\tilde{p}_t^A(\vec{x}, \tau)\nabla \tilde{p}_t^B(\vec{x}_{Rd}, t - \tau; \vec{x}, 0) - \tilde{p}_t^B(\vec{x}_{Rd}, t - \tau; \vec{x}, 0)\nabla \tilde{p}_t^A(\vec{x}, \tau)]$$ (12)

where $\Delta x$ and $\Delta y$ are separation distances between receivers in the in-line and cross-line directions, respectively; and $\Delta t$ is time sampling interval between time samples in the recording time interval [0, $T_{max}$].

Computation of the reverse-time downgoing pressure wavefield according to Equation (12) is repeated for each location $\vec{x}_{Rd}$ of the downgoing observation level 716 and for each time sample t in the recording time interval [0, $T_{max}$].

Figure 9:
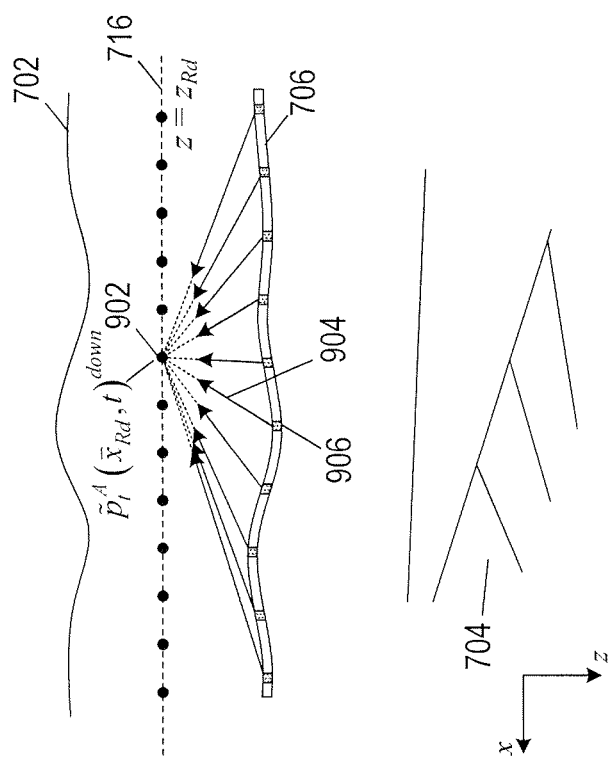
FIG. 9 shows reverse-time acoustic signals that propagate from receivers of a streamer to a downgoing observation level location.

FIG. 9 shows reverse-time impulsive acoustic energy that propagates from the receivers of the streamer 706 to a location $\vec{x}_{Rd}$ 902 of the downgoing observation level 716. Each ray path represents a portion of the downgoing pressure wavefield propagated in reverse time from a receiver of the streamer 706 to the location $\vec{x}_{Rd}$ 902. For example, ray path 904 represents a portion of the downgoing pressure wavefield propagated in reverse time from a receiver location 906 of the streamer 706 to the location $\vec{x}_{Rd}$ 902. Equation (12) approximates reverse-time downgoing pressure wavefield at the location $\vec{x}_{Rd}$ as a sum of the pressure wavefields that propagate from the receivers of the streamer 706 to the location $\vec{x}_{Rd}$ at time sample t.

Time forwarding is applied to the reverse-time downgoing pressure wavefield by substituting $T_{max}-t$ for each time sample t in $\tilde{p}_t^A(\vec{x}_{Rd}, t)^{down}$ to obtain receiver-motion-corrected downgoing pressure wavefield $p_t^A(\vec{x}_{Rd}, t)^{down}$ at each location $\vec{x}_{Rd}$ of the downgoing observation level 716 as follows:

$$\tilde{p}_t^A(\vec{x}_{Rd}, t)^{down} = p_t^A(\vec{x}_{Rd}, T_{max}-t)^{down} \to p_t^A(\vec{x}_{Rd}, t)^{down}$$ (13)

The receiver-motion-corrected downgoing pressure wavefield $p_t^A(\vec{x}_{Rd}, t)^{down}$ at each location of the static downgoing observation level 716 is corrected for arbitrary receiver motion because each downgoing pressure wavefield $p_t^A(\vec{x}_{Rd}, t)^{down}$ is located along the static downgoing observation level 716 as if wavefield separation had been performed on a pressure wavefield measured by pressure sensors located along the static downgoing observation level 716.

An expression for the upgoing pressure wavefield corrected for receiver motion is determined in the same manner as the downgoing pressure wave wavefield for a static upgoing observation level located in the horizontal xy-plane at a depth between the deepest receiver of the streamer 706 and the formation surface.

FIG. 10 shows an in-line direction and depth plane view of a physical state denoted by A. In FIG. 10, the circular outer surface $S_{out}$ encloses the free surface 702, the subterranean formation 704, the depth-varying multicomponent streamer 706, and the inner surface denoted by $S_{in}(t^A)$ that encloses the streamer 706, as described above with reference to FIG. 7A. Unlike the static downgoing observation level 716 located between the shallowest receiver of the streamer 706 and the free surface 702 shown in FIG. 7A, dashed line 1002 represents a static upgoing observation level located in the horizontal xy-plane at a constant depth $z_{Ru}$ between the deepest receiver of the streamer 706 and the formation surface of the subterranean formation 704. In physical state A, it is assumed that there are no active sources and that wavefields are zero everywhere outside the location of the moving streamer 706.

As described above with reference to Equations (2)-(5) and FIGS. 7B-7C, pressure and velocity vector wavefields measured by collocated pressure and particle motion sensors of each receiver of the streamer 706 are used to compute the reverse-time recorded pressure wavefield and the gradient of the pressure wavefield at each receiver as given by Equations (5a) and (5b).

Figure 11A:
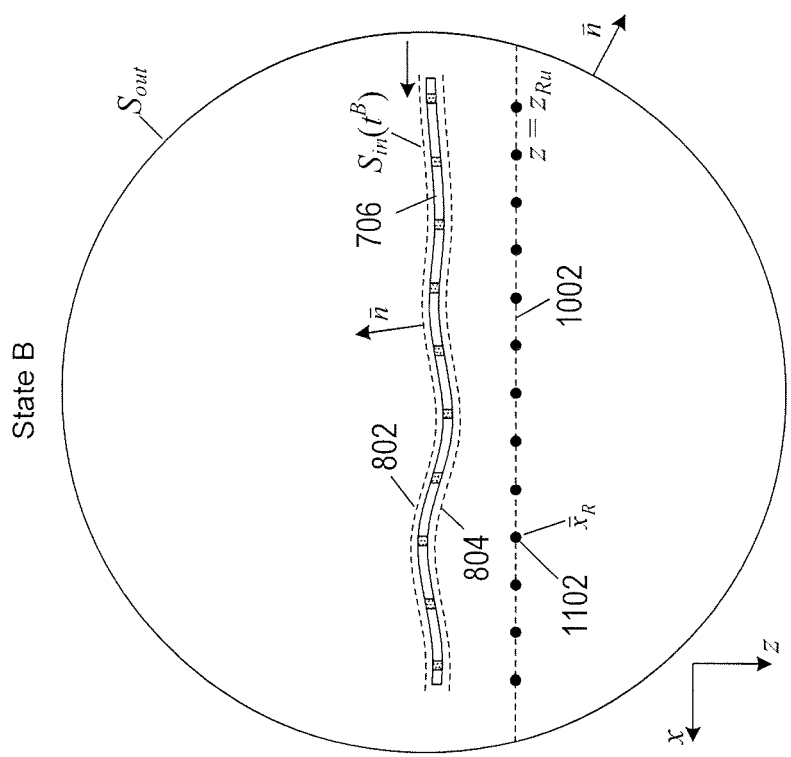
FIG. 11A shows an in-line direction and depth plane view of a free-space virtual state.

FIG. 11A shows an in-line direction and depth plane view of a free-space virtual state denoted by B. In FIG. 11A, circular outer surface $S_{out}$ encloses the streamer 706 and the upgoing observation level 1002 located below the streamer 706. Dashed curves 802 and 804 represent upper and lower surfaces of the inner surface denoted by $S_{in}(t^B)$ that encloses the streamer 706, where $t^B$ represents time in the free-space virtual state B. Solid dots represent fixed space-apart locations along the upgoing observation level 1002. For example, solid dot 1102 represents a location of the upgoing observation level 1002 with coordinates denoted by $\vec{x}_{Ru} = (\vec{x}_R, y_R, z_{Ru})$. Locations along the upgoing observation are located at the same depth $z_{Ru}$.

In the free-space virtual state B, a monopole source is conceptually located at each location $\vec{x}_{Ru}$ of the upgoing observation level 1002. Each monopole source is located along the downgoing observation level and generates an acoustic impulse with a pressure wavefield denoted by $p_t^B(\vec{x}, t^B; \vec{x}_{Ru}, t_s)$ FIG. 11B shows ray paths of impulsive acoustic energy that propagates from a monopole source at a location 1102 of the upgoing observation level 1002 to receivers of the streamer 706. For example, ray path 1104 represents impulsive acoustic energy that travels directly from the monopole source 1102 to the receiver 1106. The impulsive acoustic energy travels from the monopole sources as the streamer 706 moves in the forward direction indicated by directional arrow 1108.

A monopole source pressure wavefield that travels from a monopole source to a receiver location of the streamer 706 is represented by the Green's function:

$$p_t^B(\vec{x}, t^B; \vec{x}_{Ru}, t_s) = \frac{\delta(t^B - t_s - r_u/c)}{4\pi r_u} \quad (14a)$$

where $r_u = \sqrt{(x - x_R)^2 + (y - y_R)^2 + (z - z_{Ru})^2}$.

A gradient of the monopole source pressure wavefield that travels from a monopole source at a location of the upgoing observation level to a receiver location of the streamer is represented as follows:

$$\nabla p_t^B(\vec{x}, t^B; \vec{x}_{Ru}, t_s) = \nabla\left(\frac{\delta(t^B - t_s - r_u/c)}{4\pi r_u}\right) \quad (14b)$$

The reverse-time pressure wavefield and gradient of the pressure wavefield of the physical state A and the monopole source pressure wavefield and gradient of the monopole source pressure wavefield of free-space virtual state B are summarized in Table II:

TABLE II

| | Physical State A | Free-space virtual State B |
|---|---|---|
| Wavefield | $\tilde{p}_t^A(\vec{x}, t^A) \neq 0$ for $\vec{x} \in S_{in}(t^A)$<br>$\nabla \tilde{p}_t^A(\vec{x}, t^A) \neq 0$ for $\vec{x} \in S_{in}(t^A)$<br>$\tilde{p}_t^A(\vec{x}, t^A) = \nabla \tilde{p}_t^A(\vec{x}, t^A) = 0$<br>for $\vec{x} \notin S_{in}(t^A)$ | $p_t^B(\vec{x}, t^B; \vec{x}_{Ru}, t_s)$<br>$\nabla p_t^B(\vec{x}, t^B; \vec{x}_{Ru}, t_s)$ |
| Source | | $\delta(t^B - t_s)\delta(\vec{x} - \vec{x}_{Ru})$ |

Applying the acoustic reciprocity theorem to the wavefields in physical state A and the free-space virtual state B gives the follow integral representation:

$$\int_V \tilde{p}_t^A(\vec{x}, t^A) \delta(t^B - t_s) \delta(\vec{x} - \vec{x}_{Ru}) dV + \quad (15)$$

$$\int_V \left[\frac{1}{c^2}\left(\tilde{p}_t^A(\vec{x}, t^A) \frac{\partial^2 p_t^B(\vec{x}, t^B; \vec{x}_{Ru}, t_s)}{(\partial t^B)^2} - \right.\right.$$

$$\left.\left. p_t^B(\vec{x}, t^B; \vec{x}_{Ru}, t_s) \frac{\partial^2 \tilde{p}_t^A(\vec{x}, t^A)}{(\partial t^A)^2}\right)\right] dV =$$

$$\int_S [\tilde{p}_t^A(\vec{x}, t^A) \nabla p_t^B(\vec{x}, t^B; \vec{x}_{Ru}, t_s) - p_t^B(\vec{x}, t^B; \vec{x}_{Ru}, t_s) \nabla \tilde{p}_t^A(\vec{x}, t^A)] \cdot \vec{n}$$

$$dS$$

Solving the volume integral of the source term in Equation (15) and applying the Sommerfeld radiation condition on the surface integral S in Equation (15) as the radius of S approaches infinity gives:

$$\tilde{p}_t^A(\vec{x}_{Ru}, t^A) \delta(t^B - t_s) + \quad (16)$$

$$\int_V \left[\frac{1}{c^2}\left(\tilde{p}_t^A(\vec{x}, t^A) \frac{\partial^2 p_t^B(\vec{x}, t^B; \vec{x}_{Ru}, t_s)}{(\partial t^B)^2} - p_t^B(\vec{x}, t^B; \vec{x}_{Ru}, t_s)\right.\right.$$

$$\left.\left.\frac{\partial^2 \tilde{p}_t^A(\vec{x}, t^A)}{(\partial t^A)^2}\right)\right] dV =$$

$$\int_{S_{in}} [\tilde{p}_t^A(\vec{x}, t^A) \nabla p_t^B(\vec{x}, t^B; \vec{x}_{Ru}, t_s) - p_t^B(\vec{x}, t^B; \vec{x}_{Ru}, t_s) \nabla \tilde{p}_t^A(\vec{x}, t^A)] \cdot \vec{n}$$

$$dS$$

Applying source-receiver reciprocity in the free-space virtual state B gives a reverse-time monopole source pressure wavefield in the free-space virtual state B:

$$\tilde{p}_t^B(\vec{x}_{Ru}, t^B - t_s; \vec{x}, 0) = \frac{\delta(t - \tau + r_u/c)}{4\pi r_u} \quad (17a)$$

and gives the reverse-time gradient of the monopole source pressure wavefield is given by:

$$\nabla \tilde{p}_t^B(\vec{x}_{Ru}, t^B - t_s; \vec{x}, 0) = \nabla\left(\frac{\delta(t - \tau + r_u/c)}{4\pi r_u}\right) \quad (17b)$$

With source-receiver reciprocity, time is reversed in the free-space virtual state B. The receivers located along the streamer 706 are replaced by monopole sources. The monopole sources located along the upgoing observation level 1002 are replaced by receivers.

Figure 11C:
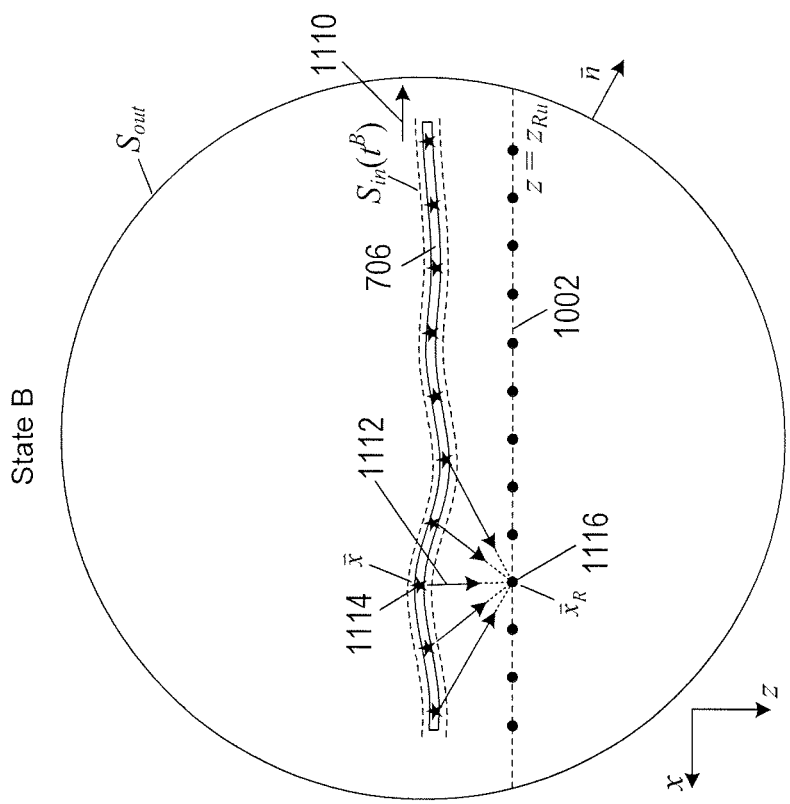
FIG. 11C shows ray paths of acoustic signals that propagate from monopole sources located along a streamer to an upgoing observation level location of the free-space virtual state.
Figure 11B:
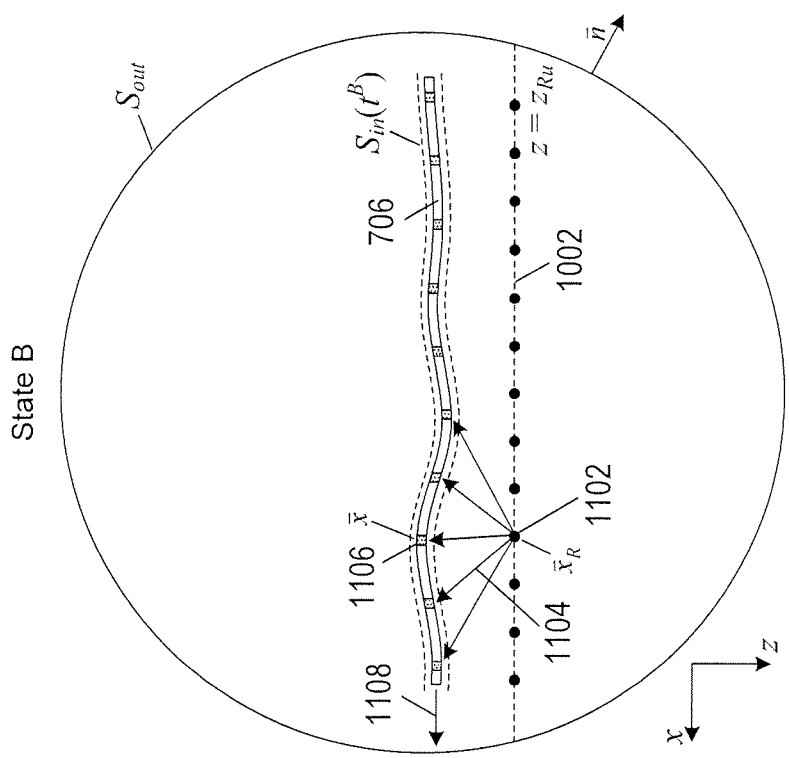
FIG. 11B shows ray paths of an acoustic signal that propagates from a monopole source at an upgoing observation level location to receivers of a streamer of the free-space virtual state.

FIG. 11C shows rays of impulsive acoustic energy that propagates from monopole sources located along the streamer 716 to a location 1116 along the upgoing observation level 1002, as the streamer 706 moves in the reverse direction as indicated indicate by directional arrow 1110. For example, ray 1112 represents time-reversed impulsive acoustic energy that travels directly from the monopole source 1114 at the location $\vec{x}$ of the streamer 706 to the location $\vec{x}_{Ru}$ 1116.

Substituting the reverse-time monopole source pressure wavefield and gradient of the reverse-time monopole source pressure wavefield of Equations (17a) and (17b) gives into Equation (16) gives:

$$\tilde{p}_t^A(\vec{x}_{Ru}, t^A)\delta(t^B - t_s) + \int_V \left[ \frac{1}{c^2} \left( \tilde{p}_t^A(\vec{x}, t^A) \frac{\partial^2 \tilde{p}_t^B(\vec{x}_{Ru}, t^B - t_s; \vec{x}, 0)}{(\partial t^B)^2} - \tilde{p}_t^B(\vec{x}_{Ru}, t^B - t_s; \vec{x}, 0) \frac{\partial^2 \tilde{p}_t^A(\vec{x}, t^A)}{(\partial t^A)^2} \right) \right] dV = \int_{S_{in}} [\tilde{p}_t^A(\vec{x}, t^A) \nabla \tilde{p}_t^B(\vec{x}_{Ru}, t^B - t_s; \vec{x}, 0) \nabla \tilde{p}_t^A(\vec{x}, t^A)] \cdot \vec{n} dS_{in} \quad (18)$$

Substituting $t=t^A+t^B-t_s$ and $\tau=t^A$ into Equation (18) followed by integrating over time $\tau$ from $-\infty$ to $\infty$ gives an integral representation of the reverse-time receiver-motion-corrected downgoing pressure wavefield at a location $\vec{x}_{Ru}$ of the downgoing observation level 716 and at time sample t as follows:

$$\tilde{p}_t^A(\vec{x}_{Ru}, t)^{up} = \int_{-\infty}^{\infty} \int_{S_{in}(\tau)} [\tilde{p}_t^A(\vec{x}, \tau) \nabla \tilde{p}_t^B(\vec{x}_{Ru}, t-\tau; \vec{x}, 0) - \tilde{p}_t^B(\vec{x}_{Ru}, t-\tau; \vec{x}, 0) \nabla \tilde{p}_t^A(\vec{x}, \tau)] \cdot \vec{n} \, dS_{in} d\tau \quad (19)$$

The inner surface integral is the pressure wavefield output from the streamer 706 to location $\vec{x}$ of the upgoing observation level 1002 at time $\tau$. The outer time integral over all time $\tau$ represents the pressure wavefield output from the streamer 706 to the location $\vec{x}_{Ru}$ of the upgoing observation level 716 for all time.

In practice, the time $\tau$ in Equation (19) is limited to discrete time samples in the time interval [0, $T_{max}$]. In addition, as displayed in Table II above, the pressure wavefields $\tilde{p}_t^A(\vec{x}, t_A)$ and $\nabla \tilde{p}_t^A(\vec{x}, t^A)$ are zero except for receivers located along the streamer 706. As a result, computation of the reverse-time receiver-motion-corrected upgoing pressure wavefield at the location $\vec{x}_{Ru}$ and time sample t of the upgoing observation level 1002 may be performed using the following double summation:

$$\tilde{p}_t^A(\vec{x}_{Ru}, t)^{up} \approx \Delta t \Delta x \Delta y \sum_{\tau=0}^{T_{max}} \sum_{\vec{x} \in S_{in}(\tau)} [\tilde{p}_t^A(\vec{x}, \tau) \nabla \tilde{p}_t^B(\vec{x}_{Ru}, t-\tau; \vec{x}, 0) - \tilde{p}_t^B(\vec{x}_{Ru}, t-\tau; \vec{x}, 0) \nabla \tilde{p}_t^A(\vec{x}, \tau)] \quad (20)$$

Computation of the reverse-time upgoing pressure wavefield according to Equation (20) is repeated for each location $\vec{x}_{Ru}$ of the upgoing observation level 1002 and for each time sample t in the time interval [0, $T_{max}$].

Figure 12:
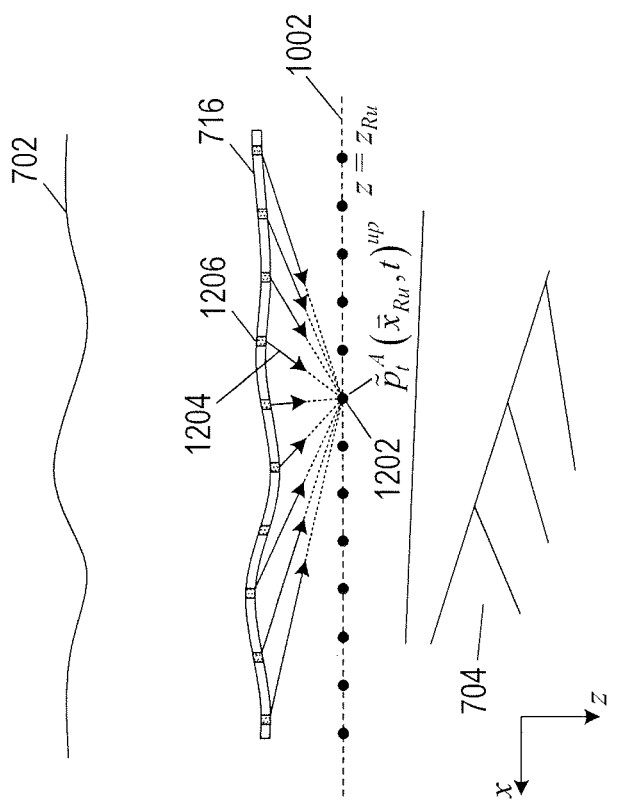
FIG. 12 shows reverse-time acoustic signals that propagate from receivers of a streamer to an upgoing observation level location.

FIG. 12 shows reverse-time acoustic signals that propagate from receivers of the streamer 706 to a location $\vec{x}_{Ru}$ 1202 of the upgoing observation level 1002. Each ray path represents a portion of an acoustic signal that propagates in reverse time from a receiver location of the streamer 706 to the location $\vec{x}_{Ru}$ 1202. For example, ray path 1204 represents a portion of the upgoing pressure wavefield propagated in reverse time from a receiver location 1206 of the streamer 706 to the location $\vec{x}_{Ru}$ 1202. Equation (19) approximates reverse-time upgoing pressure wavefield at the location $\vec{x}_{Ru}$ as a sum of pressure wavefields that propagate from the receivers of the streamer 706 to the location $\vec{x}_{Ru}$ at time sample t.

Time-forwarding is applied to the reverse-time receiver-motion-corrected upgoing pressure wavefield by substituting $T_{max}$-t for each time sample t in $\tilde{p}_t^A(\vec{x}_{Ru}, t)^{up}$ to obtain the receiver-motion-corrected upgoing pressure wavefield $p_t^A(\vec{x}_{Ru}, t)^{up}$ at each upgoing observation level location as follows:

$$\tilde{p}_t^A(\vec{x}_{Ru}, t)^{up} = p_t^A(\vec{x}_{Ru}, T_{max}-t)^{up} \to p_t^A(\vec{x}_{Ru}, t)^{up} \quad (21)$$

The receiver-motion-corrected upgoing pressure wavefield $p_t^A(\vec{x}_{Ru}, t)^{up}$ at each location of the static upgoing observation level 1002 is corrected for arbitrary receiver motion because each upgoing pressure wavefield $p_t^A(\vec{x}_{Ru}, t)^{up}$ is located along the static upgoing observation level 1002 as if wavefield separation had been performed on a pressure wavefield measured by pressure sensors located along the static upgoing observation level 1002.

Separation of pressure wavefields according to Equations (12) and (13) produces receiver-motion-corrected downgoing pressure wavefields $p_t^A(\vec{x}_{Rd}, t)^{down}$ at locations of the downgoing observation level 716. By contrast, separation of the pressure wavefields according to Equations (20) and (21) produces receiver-motion-corrected upgoing pressure wavefields $p_t^A(\vec{x}_{Ru}, t)^{up}$ at locations of the upgoing observation level 1002.

Figure 13:
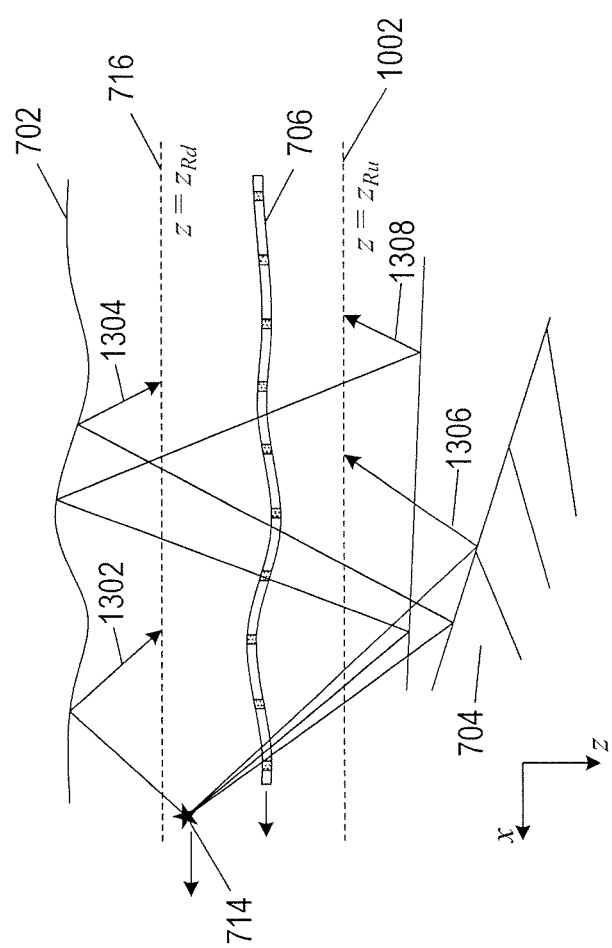
FIG. 13 shows ray paths of downgoing and upgoing pressure wavefields at different observation levels.

FIG. 13 shows ray paths of downgoing and upgoing pressure wavefields at downgoing and upgoing observation levels. Ray paths 1302 and 1304 that represent paths of acoustic energy that produce downgoing pressure wavefields at the downgoing observation level 716. Ray paths 1306 and 1308 present paths of acoustic energy that produce upgoing pressure wavefields at the upgoing observation level 1002.

An image of a subterranean formation in generated based on the receiver-motion-corrected upgoing and downgoing pressure wavefields being at the same observation level in the body of water. Because the receiver-motion-corrected upgoing and downgoing pressure wavefields are computed at different observation levels, as described above, one or both of the receiver-motion-corrected upgoing and downgoing pressure wavefields are extrapolated to the same observation level.

In certain implementations, the receiver-motion-corrected upgoing pressure wavefield is extrapolated upward from the upgoing observation level 1002 to the downgoing observation level 716. For each location along the upgoing observation level 1002, the corresponding receiver-motion-corrected upgoing pressure wavefield is transformed from the space-time domain to the frequency-wavenumber domain as follows:

$$p_t^A(\vec{x}_{Ru}, t)^{up} \to P^{up}(k_x, k_y, \omega | z_{Ru}) \quad (23)$$

where $k_x$ and $k_y$ are in-line and cross-line wavenumbers. The receiver-motion-corrected upgoing pressure wavefield may be transformed from the space-time domain to the frequency-wavenumber domain using a DFT or an FFT. The receiver-motion-corrected upgoing pressure wavefield in the frequency-wavenumber domain is extrapolated upward from the upgoing observation level 1002 to the downgoing observation level 716 as follows:

$$P^{up}(k_x, k_y, \omega | z_{Rd}) = p^{up}(k_x, k_y, \omega | z_{Ru}) \exp(-ik_z(z_{Rd}-z_{Ru})) \quad (23)$$

where i is the imaginary unit $\sqrt{-1}$;

$$k_z = \sqrt{\left(\frac{\omega}{c}\right)^2 - k_x^2 - k_y^2}$$

is the z-component wavenumber; and $\exp(-ik_z(z_{Rd}-z_{Ru}))$ is an upward extrapolation operator. The receiver-motion-corrected upgoing pressure wavefield at the downgoing observation level 716 is transformed back to the space-time domain:

$$P^{up}(k_x,k_y,\omega|z_{Rd}) \to p_t^A(\vec{x}_{Rd},t)^{up} \quad (24)$$

The receiver-motion-corrected upgoing pressure wavefield may be transformed from the frequency-wavenumber domain to the space-time domain using an inverse DFT or an inverse FFT. The receiver-motion-corrected upgoing pressure wavefield $p_t^A(\vec{x}_{Rd}, t)^{up}$ and the downgoing pressure wavefield $p_t^A(\vec{x}_{Rd}, t)^{down}$ are corrected for receiver motion following an arbitrary trajectory at each location of the static downgoing observation level.

In other implementations, the receiver-motion-corrected downgoing pressure wavefield is extrapolated downward to the upgoing observation level 1002. For each location along the downgoing observation level 716, the receiver-motion-corrected downgoing pressure wavefield is transformed from the space-time domain to the frequency-wavenumber domain as follows:

$$p_t^A(\vec{x}_{Rd},t)^{down} \to P^{down}(k_x,k_y,\omega|z_{Rd}) \quad (25)$$

The receiver-motion-corrected downgoing pressure wavefield in the frequency-wavenumber domain is extrapolated downward from the downgoing observation level 716 to the upgoing observation level 1002 as follows:

$$P^{down}(k_x,k_y,\omega|z_{Ru}) = P^{down}(k_x,k_y,\omega|z_{Rd})\exp(ik_z(z_{Rd}-z_{Ru})) \quad (26)$$

where $\exp(ik_z(z_{Rd}-z_{Ru}))$ is a downward extrapolation operator.

The receiver-motion-corrected downgoing pressure wavefield at the upgoing observation level 902 is transformed back to the space-time domain:

$$P^{down}(k_x,k_y,\omega|z_{Ru}) \to p_t^A(\vec{x}_{Ru},t)^{down} \quad (27)$$

The receiver-motion-corrected upgoing pressure wavefield $p_t^A(\vec{x}_{Ru}, t)^{up}$ and the downgoing pressure wavefield $p_t^A(\vec{x}_{Ru}, t)^{down}$ are at the same depth $z_{Ru}$. The upgoing pressure wavefield $p_t^A(\vec{x}_{Ru}, t)^{up}$ and the downgoing pressure wavefield $p_t^A(\vec{x}_{Ru}, t)^{down}$ are corrected for receiver motion following an arbitrary trajectory at each receiver location of the static upgoing observation level.

In still other implementations, the receiver-motion-corrected upgoing pressure wavefield $p_t^A(\vec{x}_{Ru}, t)^{up}$ and the receiver-motion-corrected downgoing pressure wavefield $p_t^A(\vec{x}_{Rd}, t)^{down}$ may be extrapolated to locations along a static observation level in the horizontal xy-plane and depth between the free surface 712 and the formation surface of the subterranean formation 704. For example, the receiver-motion-corrected upgoing pressure wavefield $p_t^A(\vec{x}_{Ru}, t)^{up}$ and the receiver-motion-corrected downgoing pressure wavefield $p_t^A(\vec{x}_{Rd}, t)^{down}$ may be extrapolated to an observation level at depth $z_{Ra}$ between the downgoing observation level 716 and the upgoing observation level 1002 as follows:

$$P^{up}(k_x,k_y,\omega|z_a) = P^{up}(k_x,k_y,\omega|z_{Ru})\exp(-ik_z(z_{Ra}-z_{Ru})) \quad (28a)$$

$$P^{down}(k_x,k_y,\omega|z_a) = P^{down}(k_x,k_y,\omega|z_{Rd})\exp(ik_z(z_{Ra}-z_{Rd})) \quad (28b)$$

where $z_{Ru} < z_{Ra} < z_{Rd}$;

$\exp(-ik_z(z_{Ra}-z_{Ru}))$ is an upward extrapolation operator to the observation level; and $\exp(ik_z(z_{Ra}-z_{Rd}))$ is a downward extrapolation operator to the observation level.

The receiver-motion-corrected upgoing and downgoing pressure wavefield are transformed from the frequency-wavenumber domain to the space-time domain to obtain upgoing and downgoing wavefield:

$$P^{up}(k_x,k_y,\omega|z_{Ra}) \to p_t^A(\vec{x}_{Ra},t)^{up} \quad (29a)$$

$$P^{down}(k_x,k_y,\omega|z_{Ra}) \to p_t^A(\vec{x}_{Ra},t)^{down} \quad (29b)$$

where $\vec{x}_{Ra} = (x_R, y_R, z_{Ra})$.

The receiver-motion-corrected up going pressure wavefield $p_t^A(\vec{x}_{Ra}, t)^{up}$ and the receiver-motion-corrected downgoing pressure wavefield $p_t^A(\vec{x}_{Ra}, t)^{down}$ are corrected for receiver motion following an arbitrary trajectory at each location $\vec{x}_{Ra}$ of the static observation level.

The receiver-motion-corrected upgoing pressure wavefield is further processed to generate images of the subterranean formation as described above with reference to FIG. 6. However, after wavefield separation has been applied to obtain the upgoing pressure wavefield, the upgoing pressure wavefield is not free of free surface effects, such as source ghosts and free-surface multiples. The receiver-motion-corrected downgoing pressure wavefield is used to remove free surface effects from the upgoing pressure wavefield.

Figure 14:
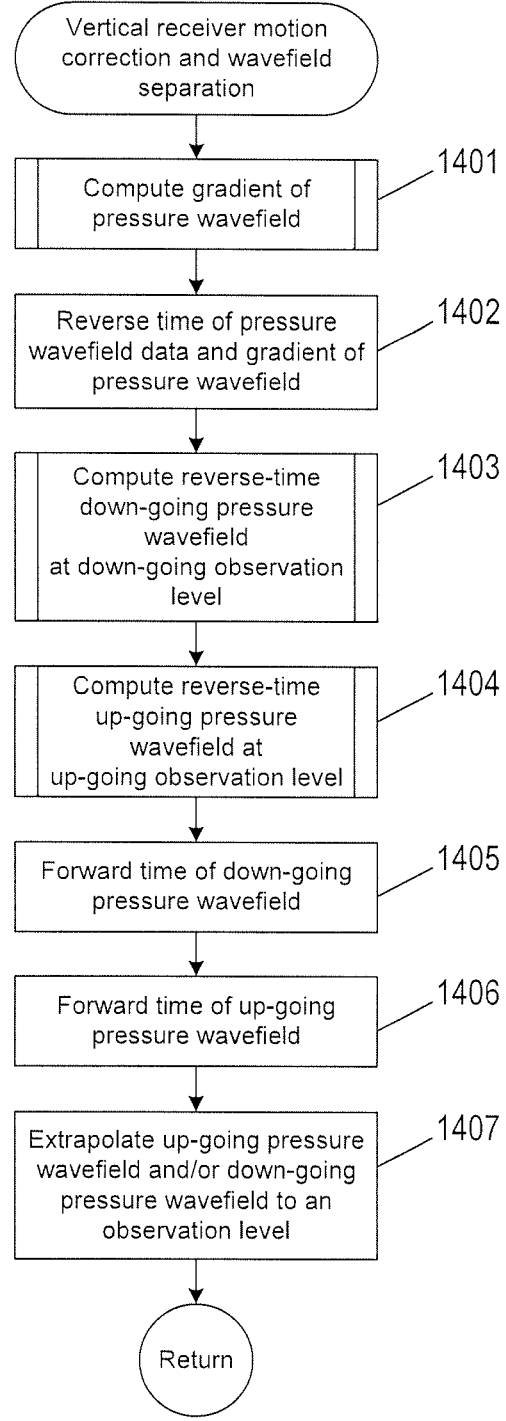
FIG. 14 shows a control-flow diagram of a "receiver motion correction and wavefield separation" block in FIG. 6.

FIG. 14 shows a control-flow diagram of a "receiver motion correction and wavefield separation" process called in block 603 of FIG. 6. The process may comprise computer implemented modules, or routines, each module comprising a series of machine-readable instructions stored in one or more data-storage devices and executed using one or more processors of a computer system described below with reference to FIG. 22. In block 1401, a routine "compute gradient of pressure wavefield" is called to compute the gradient of the pressure wavefield at each receiver location of the streamer from the velocity vector wavefield recorded at the receiver locations. In block 1402, the pressure wavefield and gradient of the pressure wavefield at each receiver location of the streamer are time reversed as described above with reference Equations (5a) and (5b), respectively. In block 1403, a routine "compute reverse-time receiver-motion-corrected downgoing pressure wavefields" is called. In block 1404, a routine "compute reverse-time receiver-motion-corrected upgoing pressure wavefields" is called. In block 1405, the reverse-time receiver-motion-corrected downgoing pressure wavefields at each location of the downgoing observation level are time forwarded to obtain a receiver-motion-corrected downgoing pressure wavefield at each location of the downgoing observation level, as described above with reference to Equation (13). In block 1406, the reverse-time receiver-motion-corrected upgoing pressure wavefields at each location of the upgoing observation level are time forwarded to obtain receiver-motion-corrected upgoing pressure wavefield at each location of the upgoing observation level, as described above with reference to Equation (21). In block 1407, one or both of the receiver-motion-corrected downgoing and the upgoing pressure wavefields are extrapolated to a static observation level, as described above with reference to Equations (22) (29). The receiver-motion-corrected upgoing and the downgoing pressure wavefields are corrected for receiver motion at each location of the static observation level.

Figure 15:
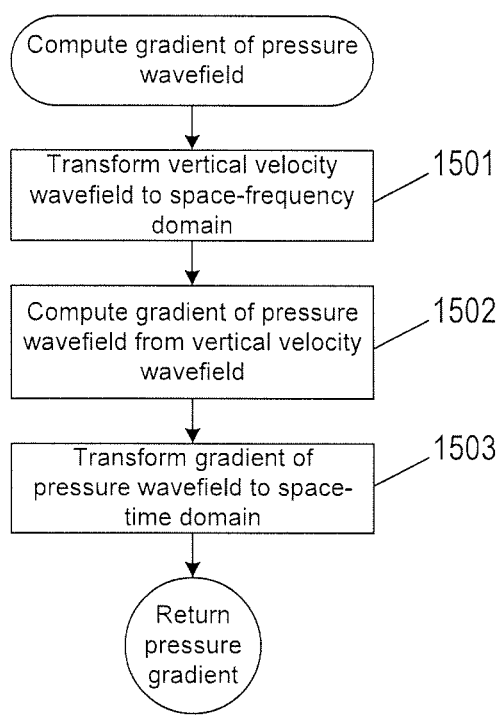
FIG. 15 shows a control-flow diagram of the "compute gradient of pressure wavefield" block in FIG. 14.

FIG. 15 shows a control-flow diagram of the routine "compute gradient of pressure wavefield" called in block 1401 of FIG. 14. In block 1501, the velocity vector wavefield at each receiver location is transformed from the space-time domain to the space-frequency domain, as described above with reference to Equation (2). In block 1502, the gradient of the pressure wavefield is computed at each receiver location from the corresponding velocity vector wavefield at the same receiver location, as described above with reference to Equation (3). In block 1503, for each receiver location, the gradient of the pressure wavefield is transformed from the space-frequency domain to the space-time domain, as described above with reference to Equation (4).

Figure 16:
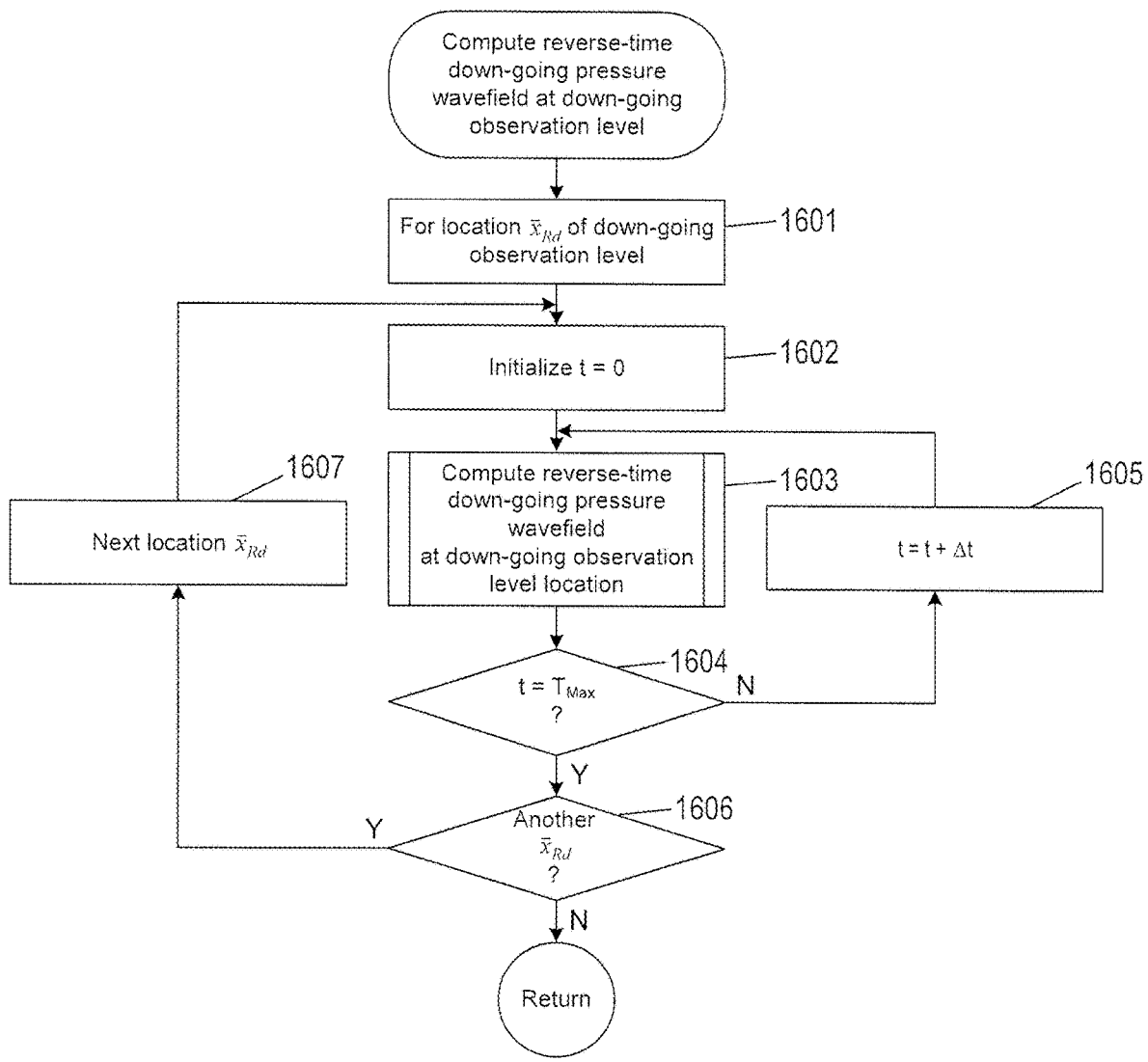
FIG. 16 shows a control-flow diagram of the "compute reverse-time receiver-motion-corrected downgoing pressure wavefields" block in FIG. 14.

FIG. 16 shows a control-flow diagram of the routine "compute reverse-time receiver-motion-corrected downgoing pressure wavefield" called in block 1403 of FIG. 14. A loop beginning with block 1601 repeats the computational operations represented by blocks 1602-1607 for each location $\vec{x}_{Rd}$ of the downgoing observation level. In block 1602, the time sample t is initialized to zero. In block 1603, a routine "compute reverse-time downgoing pressure wavefield at downgoing observation level location" is called to generate the reverse-time receiver-motion-corrected downgoing pressure wavefield $\tilde{p}_t^A(\vec{x}_{Rd}, t)^{down}$. In decision block 1604, when time sample t equals the maximum recording time $T_{max}$, control flows to decision block 1606. Otherwise, control flows to block 1605. In block 1605, the time sample t is incremented by a time sample spacing $\Delta t$. In decision block 1606, when all locations $\vec{x}_{Rd}$ of the downgoing observation level have been considered, the reverse-time downgoing pressure wavefield computed for each time sample and location $\vec{x}_{Rd}$ are returned to the routine "receiver motion correction and wavefield separation" in FIG. 14. Otherwise, control flows to block 1607. In block 1607, a next location $\vec{x}_{Rd}$ of the downgoing observation level is identified.

Figure 17:
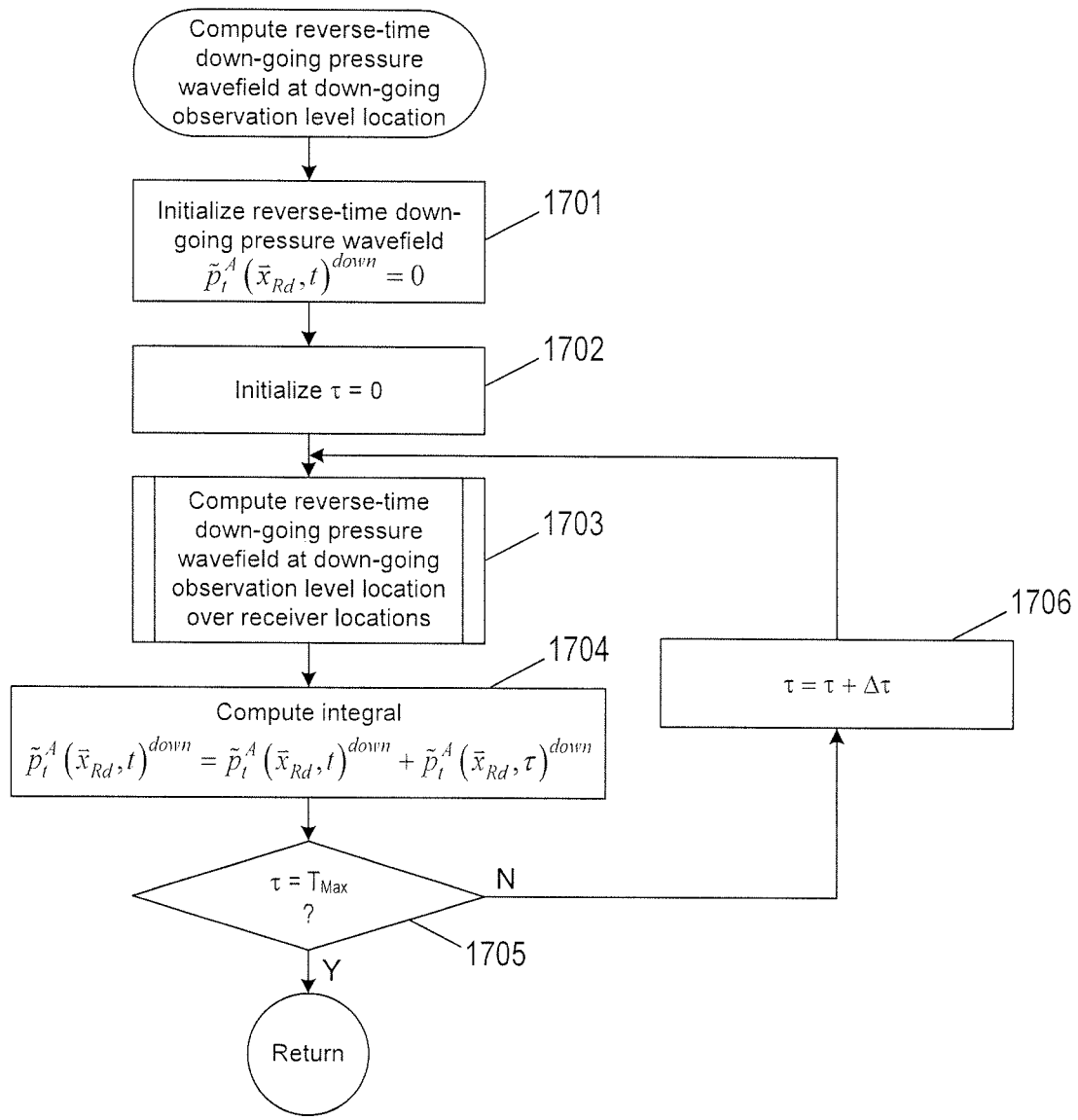
FIG. 17 shows a control-flow diagram of the "compute reverse-time downgoing pressure wavefield at downgoing observation level location" block in FIG. 16.

FIG. 17 shows a control-flow diagram of the routine "compute reverse-time downgoing pressure wavefield at downgoing observation level location" called in block 1603 of FIG. 16. In block 1701, the outer summation of the reverse-time receiver-motion-corrected downgoing pressure wavefield, denoted by $\tilde{p}_t^A(\vec{x}_{Rd}, t)^{down}$, at the location $\vec{x}_{Rd}$ of the downgoing observation level is initialized to zero. Blocks 1702-1706 compute the outer summation of Equation (12). In block 1702, the time sample $\tau$ is initialized to zero. In block 1703, a routine "compute reverse-time downgoing pressure wavefield at downgoing observation level location over receiver locations of streamer" is called to compute the inner summation over receiver locations of the streamer in Equation (12). In block 1704, the reverse-time receiver-motion-corrected downgoing pressure wavefield $\tilde{p}_t^A(\vec{x}_{Rd}, t)^{down}$ is updated by adding $\tilde{p}_t^A(\vec{x}_{Rd}, \tau)^{down}$ to a previously computed reverse-time receiver-motion-corrected downgoing pressure wavefield. In decision block 1705, when time sample $\tau$ does not equal the maximum recording time $T_{max}$, control flows to block 1706. In block 1706, the time sample $\tau$ is incremented by a time sample spacing $\Delta \tau$.

Figure 18:
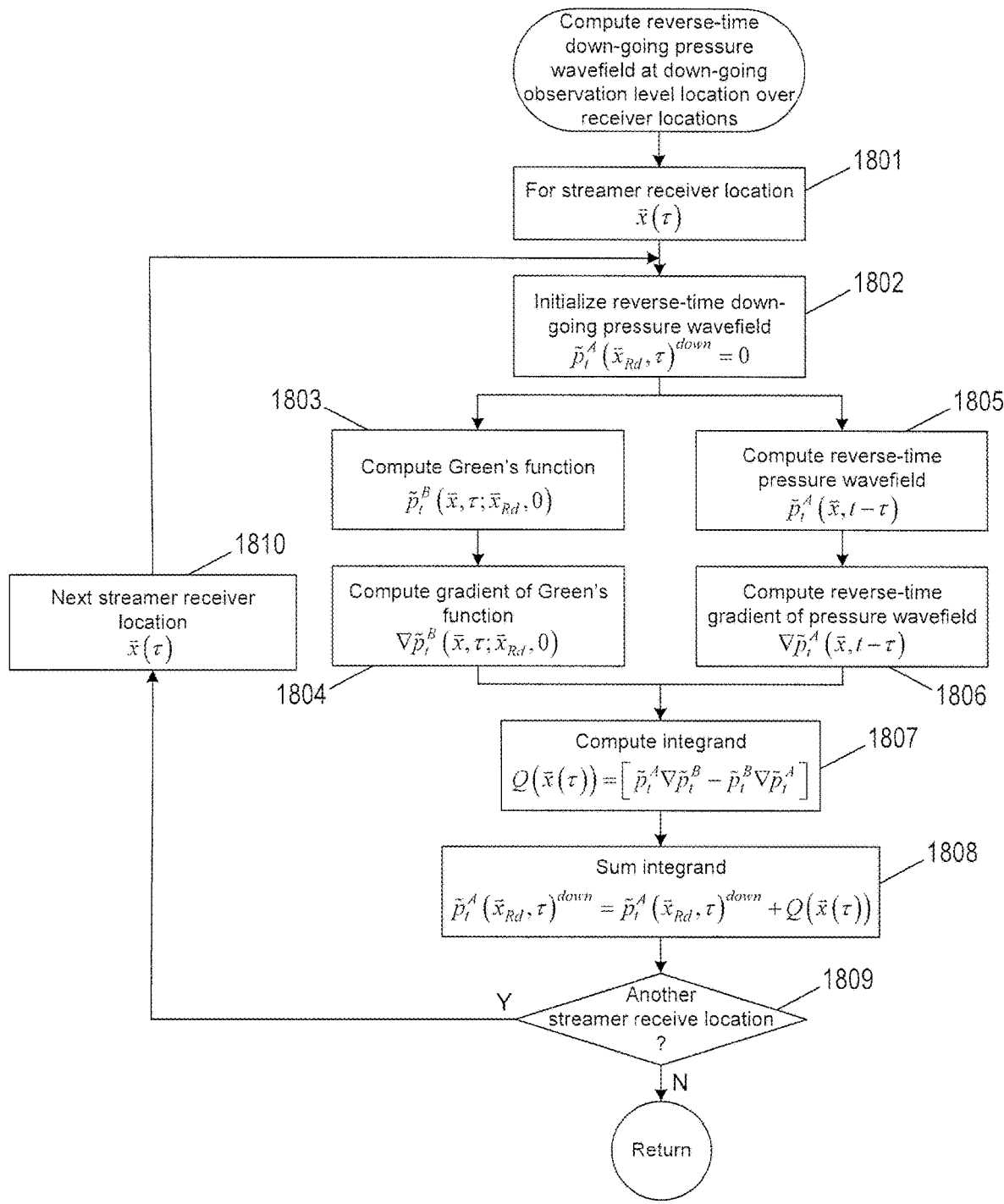
FIG. 18 shows a control-flow diagram of the "compute reverse-time downgoing pressure wavefield at downgoing observation level location over receiver locations" block in FIG. 17.

FIG. 18 shows a control-flow diagram of the routine "compute reverse-time downgoing pressure wavefield at downgoing observation level location over receiver locations" called in block 1703 of FIG. 17. A loop beginning with block 1801 repeats the computational operations represented by blocks 1802-1808 for each receiver location $\vec{x}(\tau)$ of the streamer. Blocks 1802-1810 compute the inner summation of Equation (12). In block 1802, the inner summation of the reverse-time receiver-motion-corrected downgoing pressure wavefield, denoted by $\tilde{p}_t^A(\vec{x}_{Rd}, \tau)^{down}$, at the location $\vec{x}_{Rd}$ of the downgoing observation level is initialized to zero. In block 1803, the reverse-time monopole source pressure wavefield is computed as described above with reference to Equation (10a). In block 1804, the reverse-time gradient of the monopole source pressure wavefield is computed as described above with reference to Equation (10b). In block 1805, the time sample $\tau$ is subtracted from the time sample t of the reverse-time pressure wavefield to obtain the reverse-time pressure wavefield $\tilde{p}_t^A(\vec{x}, \tau)$, as described above reference to Equation (12). In block 1806, the time sample $\tau$ is subtracted from the time sample t of the reverse-time pressure wavefield to obtain the reverse-time gradient of the pressure wavefield $\nabla \tilde{p}_t^A(\vec{x}, \tau)$, as described above reference to Equation (12). In block 1807, the summand of Equation (12) for the receiver location $\vec{x}(\tau)$ is computed and denoted by $Q(\vec{x}(\tau))$. In block 1808, the inner summation $\tilde{p}_t^A(\vec{x}_{Rd}, \tau)^{down}$ of Equation (12) is update by adding the summand $Q(\vec{x}(\tau))$. In decision block 1809, when all receiver locations $\vec{x}(\tau)$ of the streamer have been considered, the reverse-time downgoing pressure wavefield computed for the receiver locations are return to the routine "compute reverse-time downgoing pressure wavefield at downgoing observation level location" in FIG. 17. Otherwise, control flows to block 1810. In block 1810, a next receiver location $\vec{x}(\tau)$ of the streamer is identified.

Figure 19:
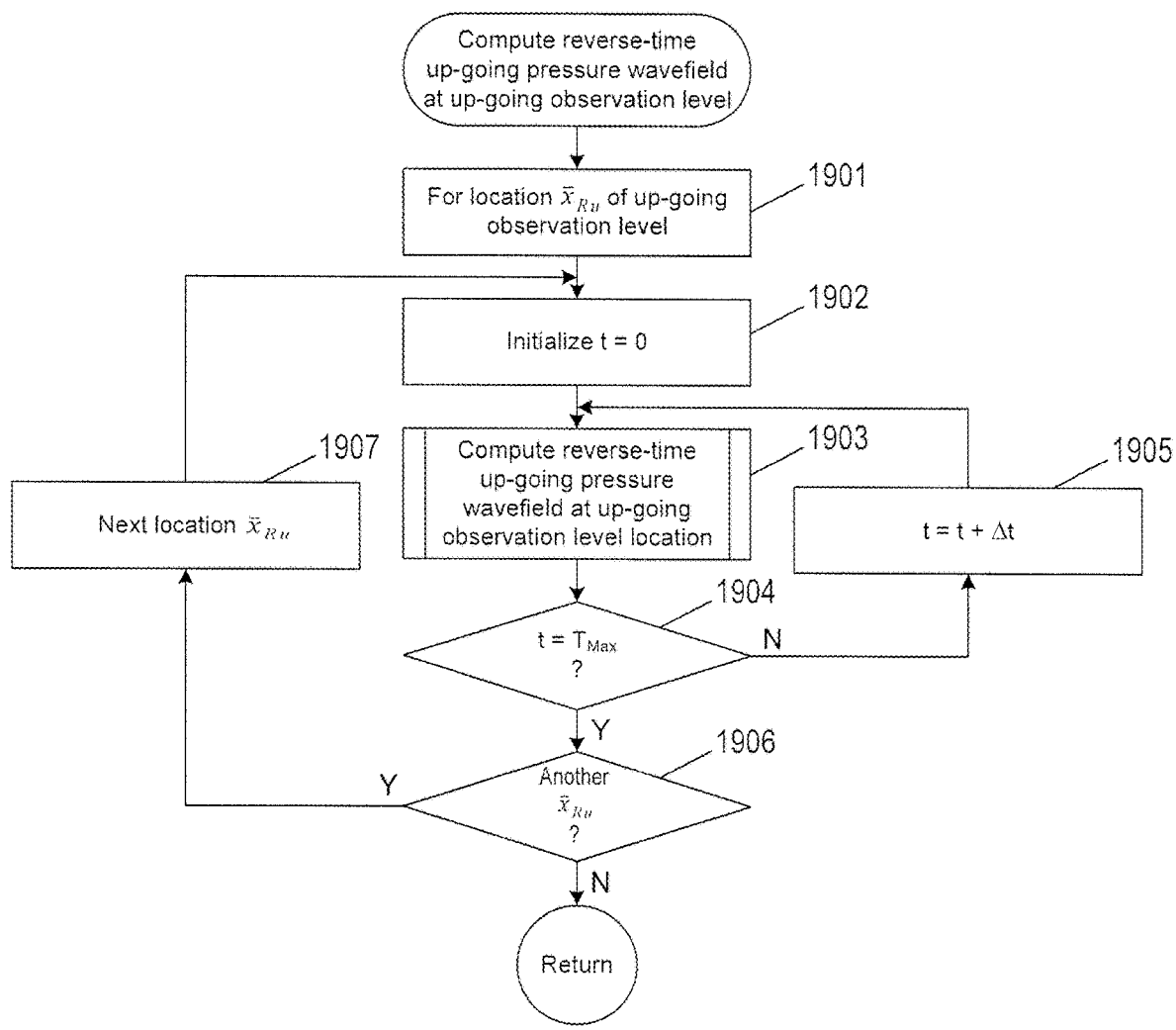
FIG. 19 shows a control-flow diagram of the "compute reverse-time receiver-motion-corrected upgoing pressure wavefield" block in FIG. 14.

FIG. 19 shows a control-flow diagram of the routine "compute reverse-time receiver-motion-corrected upgoing pressure wavefield" called in block 1404 of FIG. 14. A loop beginning with block 1901 repeats the computational operations represented by blocks 1902-1907 for each location $\vec{x}_{Ru}$ of the upgoing observation level. In block 1902, the time sample t is initialized to zero. In block 1903, a routine "compute reverse-time upgoing pressure wavefield at upgoing observation level location" is called to generate the reverse-time receiver-motion-corrected upgoing pressure wavefield $\tilde{p}_t^A(\vec{x}_{Ru}, t)^{up}$. In decision block 1904, when time sample t equals the maximum recording time $T_{max}$, control flows to decision block 1906. Otherwise, control flows to block 1905. In block 1905, the time sample t is incremented by a time sample spacing $\Delta t$. In decision block 1906, when all locations $\vec{x}_{Ru}$ of the upgoing observation level have been considered, the reverse-time upgoing pressure wavefield computed for each time sample and location $\vec{x}_{Ru}$ are returned to the routine "receiver motion correction and wavefield separation" in FIG. 14. Otherwise, control flows to block 1907. In block 1907, a next location $\vec{x}_{Ru}$ of the upgoing observation level is identified.

Figure 20:
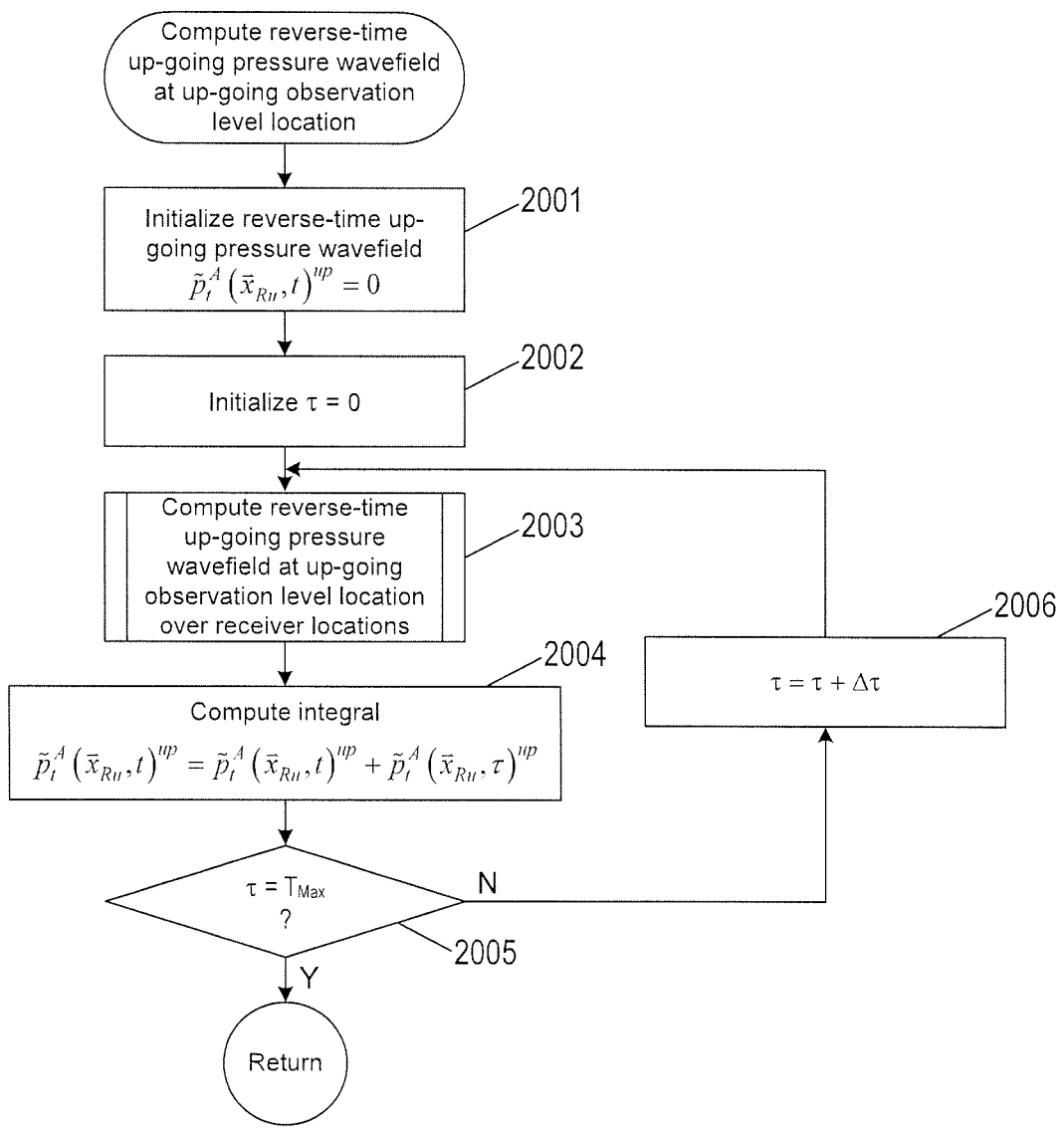
FIG. 20 shows a control-flow diagram of the "compute reverse-time downgoing pressure wavefield at downgoing observation level location" block in FIG. 19.

FIG. 20 shows a control-flow diagram of the routine "compute reverse-time downgoing pressure wavefield at upgoing observation level location" called in block 1903 of FIG. 19. In block 2001, the outer summation of the reverse-time receiver-motion-corrected upgoing pressure wavefield, denoted by $\tilde{p}_t^A(\vec{x}_{Ru}, t)^{up}$, at the location $\vec{x}_{Ru}$ of the upgoing observation level is initialized to zero. Blocks 2002-2006 compute the outer summation of Equation (20). In block 2002, the time sample $\tau$ is initialized to zero. In block 2003, a routine "compute reverse-time upgoing pressure wavefield at the upgoing observation level location over receiver locations of streamer" is called to compute the inner summation over receiver locations of the streamer in Equation (20). In block 2004, the reverse-time receiver-motion-corrected upgoing pressure wavefield $\tilde{p}_t^A(\vec{x}_{Ru}, t)^{up}$ is updated by adding $\tilde{p}_t^A(\vec{x}_{Ru}, \tau)^{up}$ to a previously computed reverse-time upgoing pressure wavefield. In decision block 2005, when time sample $\tau$ does not equal the maximum recording time $T_{max}$, control flows to block 2006. In block 2006, the time sample $\tau$ is incremented by a time sample spacing $\Delta \tau$.

Figure 21:
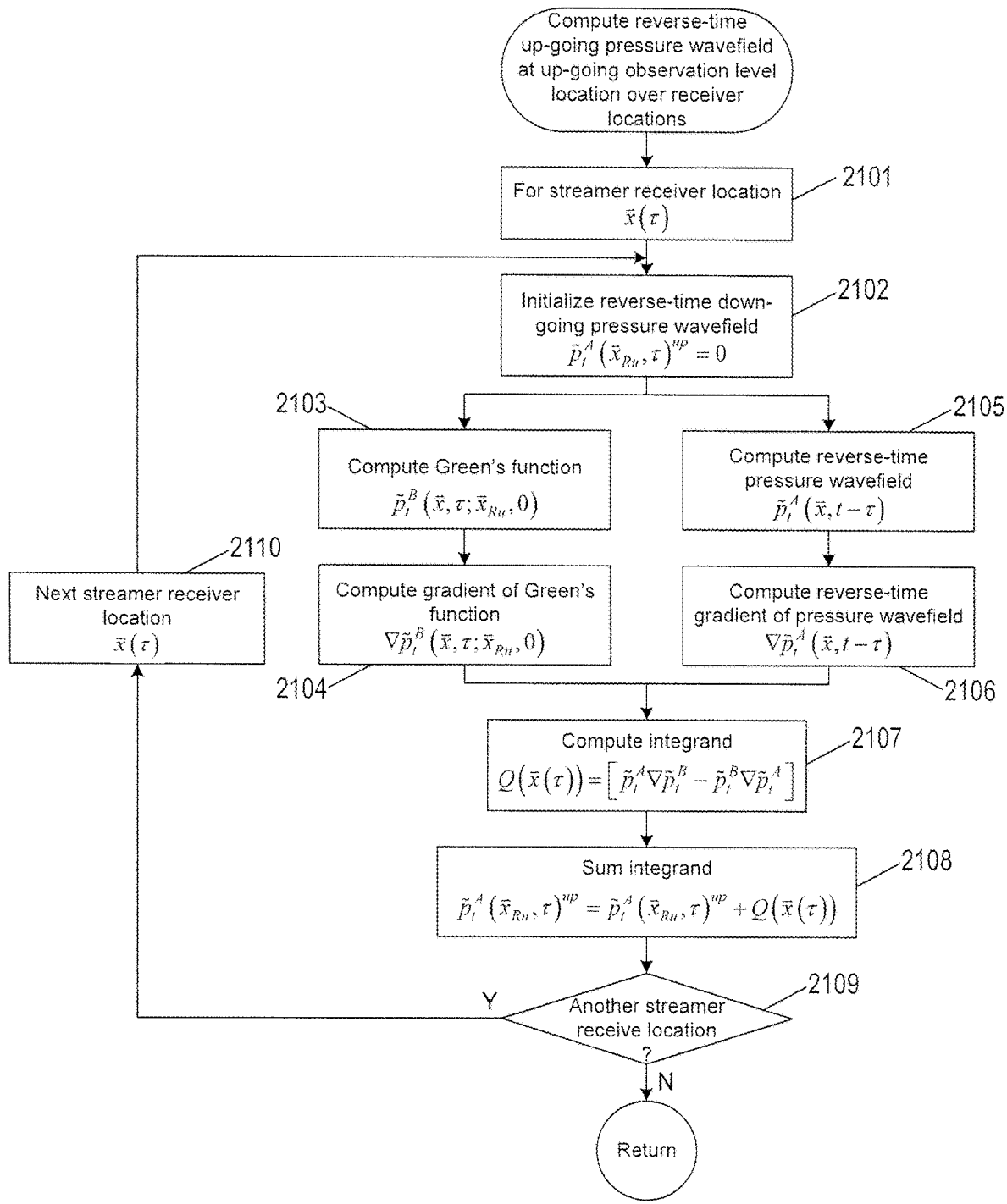
FIG. 21 shows a control-flow diagram of the "compute reverse-time upgoing pressure wavefield at upgoing observation level location over receiver locations" block in FIG. 20.

FIG. 21 shows a control-flow diagram of the routine "compute reverse-time upgoing pressure wavefield upgoing observation level location over receiver locations of streamer" called in block 2003 of FIG. 20. A loop beginning with block 2101 repeats the computational operations represented by blocks 2102-2108 for each receiver location $\vec{x}(\tau)$ of the streamer. Blocks 2102-2110 compute the inner summation of Equation (20). In block 2102, the inner summation of the reverse-time receiver-motion-corrected upgoing pressure wavefield, denoted by $\tilde{p}_t^A(\vec{x}_{Ru}, \tau)^{up}$, at the location $\vec{x}_{Ru}$ of the upgoing observation level is initialized to zero. In block 2103, the reverse-time monopole source pressure wavefield is computed as described above with reference to Equation (18a). In block 2104, the reverse-time gradient of the monopole source pressure wavefield is computed as described above with reference to Equation (18b). In block 2105, the time sample $\tau$ is subtracted from the time sample t of the reverse-time pressure wavefield to obtain the reverse-time pressure wavefield $\tilde{p}_t^A(\vec{x}, \tau)$, as described above reference to Equation (20). In block 2106, the time sample $\tau$ is subtracted from the time sample t of the reverse-time pressure wavefield to obtain the reverse-time gradient of the pressure wavefield $\nabla \tilde{p}_t^A(\vec{x}, \tau)$, as described above reference to Equation (20). In block 2107, the summand of Equation (20) for the receiver location $\vec{x}(\tau)$ is computed and denoted by $Q(\vec{x}(\tau))$. In block 2108, the inner summation $\tilde{p}_t^A(\vec{x}_{Ru}, \tau)^{up}$ of Equation (20) is updated by adding the summand $Q(\vec{x}(\tau))$. In decision block 2109, when all receiver locations $\vec{x}(\tau)$ of the streamer have been considered, the reverse-time upgoing pressure wavefield computed for the receiver locations are return to the routine "compute reverse-time upgoing pressure wavefield at upgoing observation level location" in FIG. 20. Otherwise, control flows to block 2110. In block 2110, a next receiver location $\vec{x}(\tau)$ of the streamer is identified.

Figure 22:
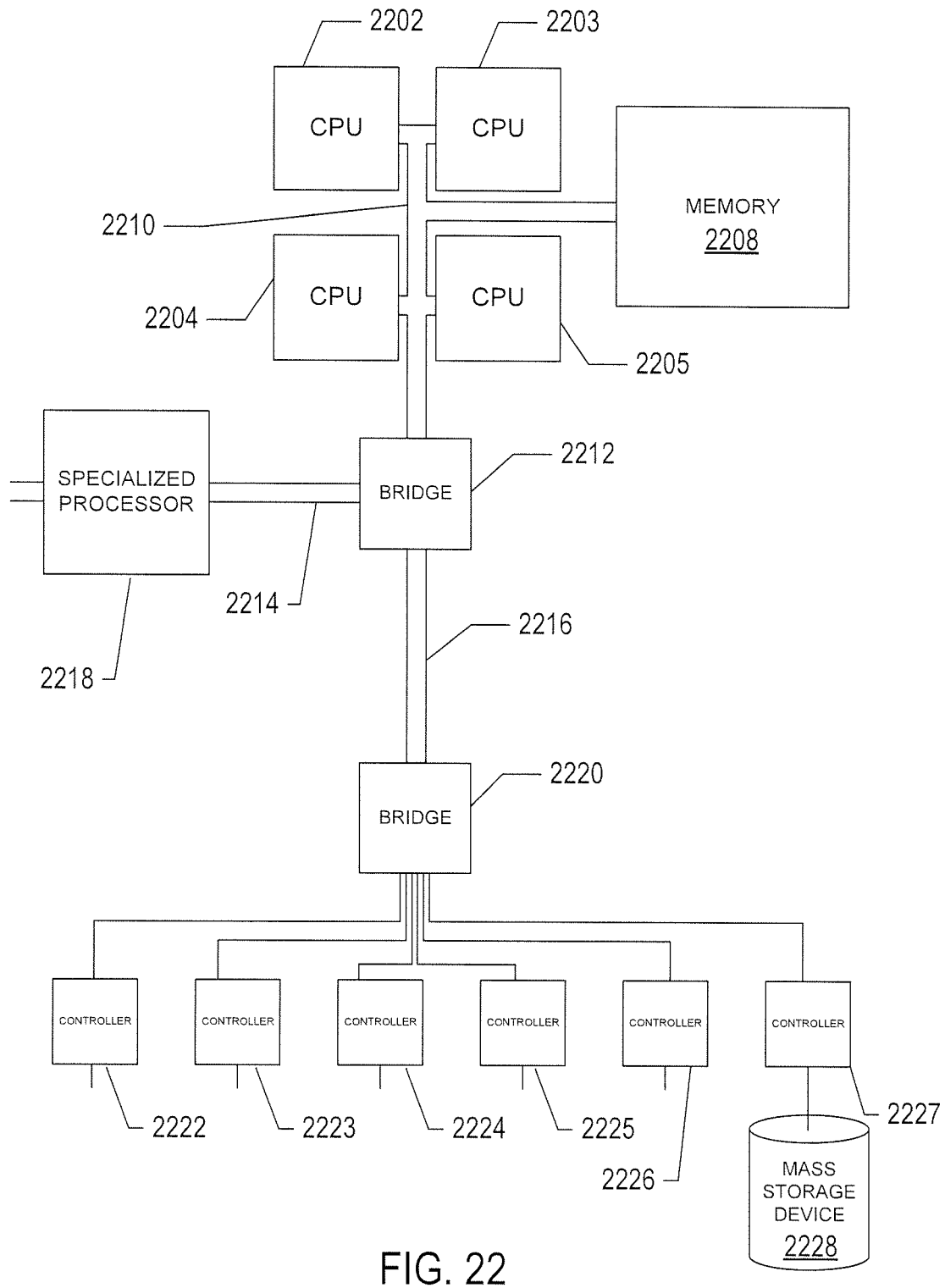
FIG. 22 shows an example computer system that may be used to execute an efficient process for generating an image of a subterranean formation.

FIG. 22 shows an example computer system that may be used to execute an efficient process for generating an image of subterranean formation and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 2202-2205, one or more electronic memories 2208 interconnected with the CPUs by a CPU/memory-subsystem bus 2210 or multiple busses, a first bridge 2212 that interconnects the CPU/memory-subsystem bus 2210 with additional busses 2214 and 2216, or other types of high-speed interconnection media, including multiple, high-speed serial interconnects. The busses or serial interconnections, in turn, connect the CPUs and memory with specialized processors, such as a graphics processor 2218, and with one or more additional bridges 2220, which are interconnected with high-speed serial links or with multiple controllers 2222-2227, such as controller 2227, that provide access to various different types of computer-readable media, such as computer-readable medium 2228, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2228 is a data-storage device, including electronic memory, optical or magnetic disk drive, USB drive, flash memory and other such data-storage device. The computer-readable medium 2228 can be used to store machine-readable instructions that encode the computational methods described above and can be used to store encoded data, during store operations, and from which encoded data can be retrieved, during read operations, by computer systems, data-storage systems, and peripheral devices.

The processes and systems disclosed herein may be used to form or process a geophysical data product 2230 indicative of certain properties of a subterranean formation. A geophysical data product 2230 may be manufactured by using the processes and systems described herein to generate geophysical data and storing the geophysical data in a computer readable medium. The geophysical data product 2230 may include geophysical data such as pressure data, particle motion data, particle velocity data, particle acceleration data, upgoing and downgoing pressure wavefield data, and any image of a subterranean formation computed from using the processes and systems described herein. The geophysical data product 2230 may be produced offshore (i.e., by equipment on the survey vessel 102) or onshore (i.e., at a computing facility on land), or both.

It is appreciated that the previous description of the disclosed embodiments is provided to enable any person skilled in the art to make or use the present disclosure. Various modifications to the embodiments will be apparent to those skilled in the art, and the generic principles defined herein may be applied to other embodiments without departing from the spirit or scope of the disclosure. Thus, the present disclosure is not intended to be limited strictly to the embodiments shown herein but is to be accorded the widest scope consistent with the principles and novel features disclosed herein.

The invention claimed is:

1. In a process for generating an image of a subterranean formation located beneath a body of water using marine seismic techniques in which one or more sources are activated in the body of water above the subterranean formation and receivers located in the body of water measure pressure and velocity vector wavefield responses from the subterranean formation and store the wavefield responses as recorded seismic data in a data-storage device, the improvement comprising:
   computing reverse-time receiver-motion-corrected downgoing pressure wavefield at each location of a downgoing observation level based on the recorded seismic data;
   computing reverse-time receiver-motion-corrected upgoing pressure wavefield at each location of an upgoing observation level based on the recorded seismic data;
   time forwarding each reverse-time receiver-motion-corrected downgoing pressure wavefield by substituting each time sample with a time difference between a maximum recording time and the time sample to obtain a corresponding receiver-motion-corrected downgoing pressure wavefield;
   time forwarding each reverse-time receiver-motion-corrected upgoing pressure wavefield by substituting each time sample with a time difference between the maximum recording time and the time sample to obtain a corresponding receiver-motion-corrected upgoing pressure wavefield;

extrapolating at least one of the receiver-motion-corrected upgoing pressure and the receiver-motion-corrected downgoing pressure wavefields to locations of a static observation level; and generating an image of the subterranean formation based at least in part on the receiver-motion-corrected upgoing pressure wavefield and the receiver-motion-corrected downgoing pressure wavefield.

2. The process of claim 1 wherein computing the reverse-time receiver-motion-corrected downgoing pressure wavefield comprises:

computing a gradient of the pressure wavefield at each receiver location based on the velocity vector wavefield recorded at each receiver location;

time reversing the pressure wavefield and the gradient of the pressure wavefield at each receiver location to obtain a reverse-time pressure wavefield and a reverse-time gradient of the pressure wavefield at each receiver location;

computing a reverse-time monopole source pressure wavefield as each location of the downgoing observation level based on a distance between a receiver location of the streamer and each location of the downgoing observation level;

computing reverse-time gradient of the monopole source pressure wavefield at each location of the downgoing observation level from the reverse-time monopole source pressure wavefield at corresponding locations of the downgoing observation level; and computing the reverse-time receiver-motion-corrected downgoing pressure wavefield at each location of the downgoing observation level based on the reverse-time pressure wavefield and the reverse-time gradient of the pressure wavefield at receiver locations and the reverse-time monopole source pressure wavefield and the reverse-time gradient of the monopole source pressure wavefield at locations of the downgoing observation level.

3. The process of claim 1 wherein computing the reverse-time receiver motion-corrected upgoing pressure wavefield comprises:

computing a gradient of the pressure wavefield at each receiver location based on the velocity vector wavefield recorded at the receiver location;

time reversing the pressure wavefield and the gradient of the pressure wavefield at each receiver location to obtain a reverse-time pressure wavefield and a reverse-time gradient of the pressure wavefield at each receiver location;

computing a reverse-time monopole source pressure wavefield as each location of the upgoing observation level based on a distance between a receiver location of the streamer and each location of the upgoing observation level;

computing reverse-time gradient of the monopole source pressure wavefield at each location of the upgoing observation level from the reverse-time monopole source pressure wavefield at corresponding locations of the upgoing observation level; and computing the reverse-time receiver-motion-corrected upgoing pressure wavefield at each location of the upgoing observation level as functions of the reverse-time pressure wavefield and the reverse-time gradient of the pressure wavefield at receiver locations and the reverse-time monopole source pressure wavefield and the reverse-time gradient of the monopole source pressure wavefield at locations of the upgoing observation level.

4. The process of claim 1 wherein extrapolating at least one of the receiver-motion-corrected upgoing pressure and the receiver-motion-corrected downgoing pressure wavefields to locations of the static observation level comprises extrapolating the receiver-motion-corrected upgoing pressure wavefields from locations of the upgoing observation level to locations of the downgoing observation level, the downgoing observation level being the static observation level.

5. The process of claim 1 wherein extrapolating at least one of the receiver-motion-corrected upgoing pressure and the receiver-motion-corrected downgoing pressure wavefields to locations of the static observation level comprises extrapolating the receiver-motion-corrected downgoing pressure wavefields from locations of the downgoing observation level to locations of the upgoing observation level, the downgoing observation level being the static observation level.

6. The process of claim 1 wherein extrapolating at least one of the receiver-motion-corrected upgoing pressure and the receiver-motion-corrected downgoing pressure wavefields to locations of the static observation level comprises:

extrapolating the receiver-motion-corrected downgoing pressure wavefields from locations of the downgoing observation level to locations of the static observation level; and extrapolating the receiver-motion-corrected upgoing pressure wavefields from locations of the upgoing observation level to the locations of the static observation level.

7. The process of claim 1 wherein the downgoing observation level is at a depth between the free surface of the body of water and shallowest depth of the receivers and the upgoing observation level is at a depth between the deepest receiver in the body of water and formation surface of the subterranean formation.

8. A computer system for computing an image of a subterranean formation from recorded seismic data collected in a marine seismic survey of the subterranean formation, the system comprising:

one or more processors;

one or more data-storage devices; and machine-readable instructions stored in the one or more data-storage devices that when executed using the one or more processors controls the system to carry out computing reverse-time receiver-motion-corrected downgoing pressure wavefield at each location of a downgoing observation level based on the recorded seismic data;

computing reverse-time receiver-motion-corrected upgoing pressure wavefield at each location of an upgoing observation level based on the recorded seismic data;

time forwarding each reverse-time receiver-motion-corrected downgoing pressure wavefield by substituting each time sample with a time difference between a maximum recording time and the time sample to obtain a corresponding receiver-motion-corrected downgoing pressure wavefield;

time forwarding each reverse-time upgoing pressure wavefield by substituting each time sample with a time difference between the maximum recording time and the time sample to obtain a corresponding receiver-motion-corrected upgoing pressure wavefield;

extrapolating at least one of the receiver-motion-corrected upgoing pressure and the receiver-motion-corrected downgoing pressure wavefields to locations of a static observation level; and generating an image of the subterranean formation based at least in part on the receiver-motion-corrected upgoing pressure wavefield and the receiver-motion-corrected downgoing pressure wavefield.

9. The computer system of claim 8 wherein computing the reverse-time receiver-motion-corrected downgoing pressure wavefield comprises:

computing a gradient of the pressure wavefield at each receiver location based on the velocity vector wavefield recorded at each receiver location;

time reversing the pressure wavefield and the gradient of the pressure wavefield at each receiver location to obtain a reverse-time pressure wavefield and a reverse-time gradient of the pressure wavefield at each receiver location;

computing a reverse-time monopole source pressure wavefield as each location of the downgoing observation level based on a distance between a receiver location of the streamer and each location of the downgoing observation level;

computing reverse-time gradient of the monopole source pressure wavefield at each location of the downgoing observation level from the reverse-time monopole source pressure wavefield at corresponding locations of the downgoing observation level; and computing the reverse-time receiver-motion-corrected downgoing pressure wavefield at each location of the downgoing observation level based on the reverse-time pressure wavefield and the reverse-time gradient of the pressure wavefield at receiver locations and the reverse-time monopole source pressure wavefield and the reverse-time gradient of the monopole source pressure wavefield at locations of the downgoing observation level.

10. The computer system of claim 8 wherein computing the reverse-time receiver-motion-corrected upgoing pressure wavefield at each location of the upgoing observation level comprises:

computing a gradient of the pressure wavefield at each receiver location based on the velocity vector wavefield recorded at the receiver location;

time reversing the pressure wavefield and the gradient of the pressure wavefield at each receiver location to obtain a reverse-time pressure wavefield and a reverse-time gradient of the pressure wavefield at each receiver location;

computing a reverse-time monopole source pressure wavefield as each location of the upgoing observation level based on a distance between a receiver location of the streamer and each location of the upgoing observation level;

computing reverse-time gradient of the monopole source pressure wavefield at each location of the upgoing observation level from the reverse-time monopole source pressure wavefield at corresponding locations of the upgoing observation level; and computing the reverse-time receiver-motion-corrected upgoing pressure wavefield at each location of the upgoing observation level as functions of the reverse-time pressure wavefield and the reverse-time gradient of the pressure wavefield at receiver locations and the reverse-time monopole source pressure wavefield and the reverse-time gradient of the monopole source pressure wavefield at locations of the upgoing observation level.

11. The computer system of claim 8 wherein extrapolating at least one of the receiver-motion-corrected upgoing pressure and the receiver-motion-corrected downgoing pressure wavefields to locations of the static observation level comprises extrapolating the receiver-motion-corrected upgoing pressure wavefields from locations of the upgoing observation level to locations of the downgoing observation level, the downgoing observation level being the static observation level.

12. The computer system of claim 8 wherein extrapolating at least one of the receiver-motion-corrected upgoing pressure and the receiver-motion-corrected downgoing pressure wavefields to locations of the static observation level comprises extrapolating the receiver-motion-corrected downgoing pressure wavefields from locations of the downgoing observation level to locations of the upgoing observation level, the downgoing observation level being the static observation level.

13. The computer system of claim 8 wherein extrapolating at least one of the receiver-motion-corrected upgoing pressure and the receiver-motion-corrected downgoing pressure wavefields to locations of the static observation level comprises:

extrapolating the receiver-motion-corrected downgoing pressure wavefields from locations of the downgoing observation level to locations of the static observation level; and extrapolating the receiver-motion-corrected upgoing pressure wavefields from locations of the upgoing observation level to the locations of the static observation level.

14. The computer system of claim 8 wherein the downgoing observation level is at a depth between the free surface of the body of water and shallowest depth of the receivers and the upgoing observation level is at a depth between the deepest receiver in the body of water and formation surface of the subterranean formation.

15. A non-transitory computer-readable medium encoded with machine-readable instructions that implement a method carried out by one or more processors of a computer system to perform operations comprising:

computing reverse-time receiver-motion-corrected downgoing pressure wavefield at each location of a downgoing observation level based on recorded seismic data obtained in marine survey of a subterranean formation;

computing reverse-time receiver-motion-corrected upgoing pressure wavefield at each location of an upgoing observation level based on the recorded seismic data;

time forwarding each reverse-time receiver-motion-corrected downgoing pressure wavefield by substituting each time sample with a time difference between a maximum recording time and the time sample to obtain a corresponding receiver-motion-corrected downgoing pressure wavefield;

time forwarding each reverse-time receiver-motion-corrected upgoing pressure wavefield by substituting each time sample with a time difference between the maximum recording time and the time sample to obtain a corresponding receiver-motion-corrected upgoing pressure wavefield;

extrapolating at least one of the receiver-motion-corrected upgoing pressure and the receiver-motion-corrected downgoing pressure wavefields to locations of a static observation level; and generating an image of the subterranean formation based at least in part on the receiver-motion-corrected upgoing pressure wavefield and the receiver-motion-corrected downgoing pressure wavefield.

16. The medium of claim 15 wherein computing the reverse-time receiver-motion-corrected downgoing pressure wavefield comprises:

computing a gradient of the pressure wavefield at each receiver location based on the velocity vector wavefield recorded at each receiver location;

time reversing the pressure wavefield and the gradient of the pressure wavefield at each receiver location to obtain a reverse-time pressure wavefield and a reverse-time gradient of the pressure wavefield at each receiver location;

computing a reverse-time monopole source pressure wavefield as each location of the downgoing observation level based on a distance between a receiver location of the streamer and each location of the downgoing observation level;

computing reverse-time gradient of the monopole source pressure wavefield at each location of the downgoing observation level from the reverse-time monopole source pressure wavefield at corresponding locations of the downgoing observation level; and computing the reverse-time receiver-motion-corrected downgoing pressure wavefield at each location of the downgoing observation level based on the reverse-time pressure wavefield and the reverse-time gradient of the pressure wavefield at receiver locations and the reverse-time monopole source pressure wavefield and the reverse-time gradient of the monopole source pressure wavefield at locations of the downgoing observation level.

17. The medium of claim 15 wherein computing the reverse-time receiver-motion-corrected upgoing pressure wavefield comprises:

computing a gradient of the pressure wavefield at each receiver location based on the velocity vector wavefield recorded at the receiver location;

time reversing the pressure wavefield and the gradient of the pressure wavefield at each receiver location to obtain a reverse-time pressure wavefield and a reverse-time gradient of the pressure wavefield at each receiver location;

computing a reverse-time monopole source pressure wavefield as each location of the upgoing observation level based on a distance between a receiver location of the streamer and each location of the upgoing observation level:

computing reverse-time gradient of the monopole source pressure wavefield at each location of the upgoing observation level from the reverse-time monopole source pressure wavefield at corresponding locations of the upgoing observation level; and computing the reverse-time receiver-motion-corrected upgoing pressure wavefield at each location of the upgoing observation level as functions of the reverse-time pressure wavefield and the reverse-time gradient of the pressure wavefield at receiver locations and the reverse-time monopole source pressure wavefield and the reverse-time gradient of the monopole source pressure wavefield at locations of the upgoing observation level.

18. The medium of claim 15 wherein extrapolating at least one of the receiver-motion-corrected upgoing pressure and the receiver-motion-corrected downgoing pressure wavefields to locations of the static observation level comprises extrapolating the receiver-motion-corrected upgoing pressure wavefields from locations of the upgoing observation level to locations of the downgoing observation level, the downgoing observation level being the static observation level.

19. The medium of claim 15 wherein extrapolating at least one of the receiver-motion-corrected upgoing pressure and the receiver-motion-corrected downgoing pressure wavefields to locations of the static observation level comprises extrapolating the receiver-motion-corrected downgoing pressure wavefields from locations of the downgoing observation level to locations of the upgoing observation level, the downgoing observation level being the static observation level.

20. The medium of claim 15 wherein extrapolating at least one of the receiver-motion-corrected upgoing pressure and the receiver-motion-corrected downgoing pressure wavefields to locations of the static observation level comprises:

extrapolating the receiver-motion-corrected downgoing pressure wavefields from locations of the downgoing observation level to locations of the static observation level; and extrapolating the receiver-motion-corrected upgoing pressure wavefields from locations of the upgoing observation level to the locations of the static observation level.

21. The medium of claim 15 wherein the downgoing observation level is at a depth between the free surface of the body of water and shallowest depth of the receivers and the upgoing observation level is at a depth between the deepest receiver in the body of water and formation surface of the subterranean formation.

22. An apparatus for generating an image of a subterranean formation from recorded seismic data collected in a marine seismic survey of the subterranean formation, the apparatus comprising:

means for computing reverse-time receiver-motion-corrected downgoing pressure wavefield at each location of a downgoing observation level based on the recorded seismic data;

means for computing reverse-time receiver-motion-corrected upgoing pressure wavefield at each location of an upgoing observation level based on the recorded seismic data;

means for time forwarding each reverse-time receiver-motion-corrected downgoing pressure wavefield by substituting each time sample with a time difference between a maximum recording time and the time sample to obtain a corresponding receiver-motion-corrected downgoing pressure wavefield;

means for time forwarding each reverse-time receiver-motion-corrected upgoing pressure wavefield to by substituting each time sample with a time difference between the maximum recording time and the time sample obtain a corresponding receiver-motion-corrected upgoing pressure wavefield;

means for extrapolating at least one of the receiver-motion-corrected upgoing pressure and the receiver-motion-corrected downgoing pressure wavefields to locations of a static observation level; and means for generating an image of the subterranean formation based at least in part on the receiver-motion-corrected upgoing pressure wavefield and the receiver-motion-corrected downgoing pressure wavefield.

23. The apparatus of claim 22 wherein the means for computing the receiver-motion-corrected reverse-time downgoing pressure wavefield comprises:
compute a gradient of the pressure wavefield at each receiver location based on the velocity vector wavefield recorded at each receiver location;
time reverses the pressure wavefield and the gradient of the pressure wavefield at each receiver location to obtain a reverse-time pressure wavefield and a reverse-time gradient of the pressure wavefield at each receiver location;
computes a reverse-time monopole source pressure wavefield as each location of the downgoing observation level based on a distance between a receiver location of the streamer and each location of the downgoing observation level;
computes reverse-time gradient of the monopole source pressure wavefield at each location of the downgoing observation level from the reverse-time monopole source pressure wavefield at corresponding locations of the downgoing observation level; and
computes the receiver-motion-corrected reverse-time downgoing pressure wavefield at each location of the downgoing observation level based on the reverse-time pressure wavefield and the reverse-time gradient of the pressure wavefield at receiver locations and the reverse-time monopole source pressure wavefield and the reverse-time gradient of the monopole source pressure wavefield at locations of the downgoing observation level.

24. The apparatus of claim 22 wherein the means for computing the reverse-time receiver-motion-corrected upgoing pressure wavefield comprises:
computes a gradient of the pressure wavefield at each receiver location based on the velocity vector wavefield recorded at the receiver location;
time reverses the pressure wavefield and the gradient of the pressure wavefield at each receiver location to obtain a reverse-time pressure wavefield and a reverse-time gradient of the pressure wavefield at each receiver location;
computes a reverse-time monopole source pressure wavefield as each location of the upgoing observation level based on a distance between a receiver location of the streamer and each location of the upgoing observation level;
computes reverse-time gradient of the monopole source pressure wavefield at each location of the upgoing observation level from the reverse-time monopole source pressure wavefield at corresponding locations of the upgoing observation level; and
computes the reverse-time receiver-motion-corrected upgoing pressure wavefield at each location of the upgoing observation level as functions of the reverse-time pressure wavefield and the reverse-time gradient of the pressure wavefield at receiver locations and the reverse-time monopole source pressure wavefield and the reverse-time gradient of the monopole source pressure wavefield at locations of the upgoing observation level.

25. The apparatus of claim 22 wherein the means for extrapolating at least one of the receiver-motion-corrected upgoing pressure and the receiver-motion-corrected downgoing pressure wavefields to locations of the static observation level comprises extrapolates the upgoing pressure wavefields from locations of the upgoing observation level to locations of the downgoing observation level, the downgoing observation level being the static observation level.

26. The apparatus of claim 22 wherein the means for extrapolating at least one of the receiver-motion-corrected upgoing pressure and the receiver-motion-corrected downgoing pressure wavefields to locations of the static observation level comprises extrapolates the receiver-motion-corrected downgoing pressure wavefields from locations of the downgoing observation level to locations of the upgoing observation level, the downgoing observation level being the static observation level.

27. The apparatus of claim 22 wherein the means for extrapolating at least one of the receiver-motion-corrected upgoing pressure and the receiver-motion-corrected downgoing pressure wavefields to locations of the static observation level comprises:
extrapolates the receiver-motion-corrected downgoing pressure wavefields from locations of the downgoing observation level to locations of the static observation level; and
extrapolates the receiver-motion-corrected upgoing pressure wavefields from locations of the upgoing observation level to the locations of the static observation level.

28. The apparatus of claim 22 wherein the downgoing observation level is at a depth between the free surface of the body of water and shallowest depth of the receivers and the upgoing observation level is at a depth between the deepest receiver in the body of water and formation surface of the subterranean formation.

29. A method of manufacturing a geophysical data product, the method comprising:
computing reverse-time receiver-motion-corrected downgoing pressure wavefield at each location of a downgoing observation level based on recorded seismic data obtained in marine survey of a subterranean formation;
computing reverse-time receiver-motion-corrected upgoing pressure wavefield at each location of an upgoing observation level based on the recorded seismic data;
time forwarding each reverse-time receiver-motion-corrected downgoing pressure wavefield by substituting each time sample with a time difference between a maximum recording time and the time sample to obtain a corresponding receiver-motion-corrected downgoing pressure wavefield;
time forwarding each reverse-time receiver-motion-corrected upgoing pressure wavefield by substituting each time sample with a time difference between the maximum recording time and the time sample to obtain a corresponding receiver-motion-corrected upgoing pressure wavefield;
extrapolating at least one of the receiver-motion-corrected upgoing pressure and the receiver-motion-corrected downgoing pressure wavefields to locations of a static observation level;
generating an image of the subterranean formation based at least in part on the receiver-motion-corrected upgoing pressure wavefield and the receiver-motion-corrected downgoing pressure wavefield; and
storing the image in a non-transitory computer-readable medium.

* * * * *